(12) United States Patent
Hietala et al.

(10) Patent No.: US 7,602,860 B2
(45) Date of Patent: *Oct. 13, 2009

(54) METHOD AND SYSTEM FOR DECODING MULTILEVEL SIGNALS

(75) Inventors: Vincent Mark Hietala, Albuquerque, NM (US); Andrew Joo Kim, Duluth, GA (US)

(73) Assignee: Quellan, Inc., Atlanta, GA (US)

( * ) Notice: Subject to any disclaimer, the term of this patent is extended or adjusted under 35 U.S.C. 154(b) by 66 days.

This patent is subject to a terminal disclaimer.

(21) Appl. No.: 11/633,658

(22) Filed: Dec. 4, 2006

(65) Prior Publication Data

US 2007/0171998 A1 Jul. 26, 2007

Related U.S. Application Data

(63) Continuation of application No. 10/108,598, filed on Mar. 28, 2002, now Pat. No. 7,215,721.

(51) Int. Cl.
*H04L 25/26* (2006.01)
*H04B 10/06* (2006.01)
(52) U.S. Cl. .................... 375/317; 398/202
(58) Field of Classification Search .......... 375/317; 398/202
See application file for complete search history.

(56) References Cited

U.S. PATENT DOCUMENTS

| | | |
|---|---|---|
| 2,632,058 A | 3/1953 | Gray |
| 3,445,771 A | 5/1969 | Clapham et al. |
| 3,571,725 A | 3/1971 | Kaneko et al. |
| 3,599,122 A | 8/1971 | Leuthoki .................. 333/29 |
| 3,714,437 A | 1/1973 | Kinsel |

(Continued)

FOREIGN PATENT DOCUMENTS

EP 0 527 966 B1 9/1994

(Continued)

OTHER PUBLICATIONS

André; InP DHBT Technology and Design Methodology for High-Bit-Rate Optical Communications Circuits; IEEE Journal of Solid-State Circuits; vol. 33, No. 9, Sep. 1998; pp. 1328-1335.

(Continued)

*Primary Examiner*—Kevin Y Kim
(74) *Attorney, Agent, or Firm*—King & Spalding

(57) ABSTRACT

A multilevel optical receiver can comprise a plurality of comparators that generally correspond with the number of levels in a multilevel data stream. Each comparator can be individually controlled and fed a decision threshold in order to decode a multilevel signal. The multilevel optical receiver can generate a statistical characterization of the received symbols in the form of a marginal cumulative distribution function (CDF) or probability density function (pdf). This characterization can be used to produce a set of $\epsilon$-support estimates from which conditional pdfs are derived for each of the transmission symbols. These conditional pdfs may then be used to determine decision thresholds for decoding the received signal. The conditional pdfs may further be used to continuously estimate the fidelity or error rate of the received signal without the transmission of a testing sequence. The $\epsilon$-supports may further be used to automatically control the gain on the receiver.

19 Claims, 15 Drawing Sheets

U.S. PATENT DOCUMENTS

| | | |
|---|---|---|
| 3,806,915 A | 4/1974 | Higgins et al. |
| 3,977,795 A | 8/1976 | Buschmann |
| 4,201,909 A | 5/1980 | Dogliotti et al. ............ 455/608 |
| 4,287,756 A | 9/1981 | Gallagher |
| 4,288,872 A | 9/1981 | Tamburelli ................. 375/14 |
| 4,349,914 A | 9/1982 | Evans |
| 4,363,127 A | 12/1982 | Evans et al. |
| 4,386,339 A | 5/1983 | Henry et al. |
| 4,387,461 A | 6/1983 | Evans |
| 4,393,499 A | 7/1983 | Evans |
| 4,410,878 A | 10/1983 | Stach ........................ 340/347 |
| 4,464,771 A | 8/1984 | Sorensen |
| 4,470,126 A | 9/1984 | Haque |
| 4,475,227 A | 10/1984 | Belfield ....................... 381/30 |
| 4,479,266 A | 10/1984 | Eumurian et al. |
| 4,521,883 A | 6/1985 | Roché |
| 4,580,263 A | 4/1986 | Watanabe et al. |
| 4,584,720 A | 4/1986 | Garrett |
| 4,618,941 A | 10/1986 | Linder et al. |
| 4,646,173 A | 2/1987 | Kammeyer et al. ........... 360/51 |
| 4,651,026 A | 3/1987 | Serfaty et al. |
| 4,751,497 A | 6/1988 | Torii |
| 4,830,493 A | 5/1989 | Giebeler |
| 4,847,521 A | 7/1989 | Huignard et al. |
| 4,864,590 A | 9/1989 | Arnon et al. |
| 4,873,700 A | 10/1989 | Wong ........................... 375/76 |
| 4,912,726 A | 3/1990 | Iwamatsu et al. |
| 4,942,593 A | 7/1990 | Whiteside et al. |
| 4,953,041 A | 8/1990 | Huber ........................ 360/46 |
| 4,959,535 A | 9/1990 | Garrett |
| 4,978,957 A | 12/1990 | Hotta et al. |
| 5,007,106 A | 4/1991 | Kahn et al. |
| 5,008,957 A | 4/1991 | Klyono |
| 5,012,475 A | 4/1991 | Campbell |
| 5,067,126 A | 11/1991 | Moore |
| 5,072,221 A | 12/1991 | Schmidt |
| 5,111,065 A | 5/1992 | Roberge |
| 5,113,278 A | 5/1992 | Degura et al. |
| 5,115,450 A | 5/1992 | Arcuri |
| 5,121,411 A | 6/1992 | Fluharty |
| 5,128,790 A | 7/1992 | Heidemann et al. |
| 5,132,639 A | 7/1992 | Blauvelt et al. |
| 5,151,698 A | 9/1992 | Pophillat |
| 5,181,034 A | 1/1993 | Takakura et al. |
| 5,181,136 A | 1/1993 | Kavehrad et al. |
| 5,184,131 A | 2/1993 | Ikeda |
| 5,208,833 A | 5/1993 | Erhart et al. |
| 5,222,103 A | 6/1993 | Gross |
| 5,223,834 A | 6/1993 | Wang et al. |
| 5,225,798 A | 7/1993 | Hunsinger et al. |
| 5,237,590 A | 8/1993 | Kazawa et al. |
| 5,243,613 A | 9/1993 | Gysel et al. |
| 5,252,930 A | 10/1993 | Blauvelt |
| 5,282,072 A | 1/1994 | Nazarathy et al. |
| 5,283,679 A | 2/1994 | Wedding |
| 5,291,031 A | 3/1994 | MacDonald et al. |
| 5,293,406 A | 3/1994 | Suzuki |
| 5,300,930 A | 4/1994 | Burger et al. |
| 5,321,543 A | 6/1994 | Huber |
| 5,321,710 A | 6/1994 | Cornish et al. |
| 5,327,279 A | 7/1994 | Farina et al. |
| 5,343,322 A | 8/1994 | Pirio et al. |
| 5,351,148 A | 9/1994 | Maeda et al. |
| 5,355,240 A | 10/1994 | Prigent et al. |
| 5,361,156 A | 11/1994 | Pidgeon |
| 5,371,625 A | 12/1994 | Wedding et al. |
| 5,373,384 A | 12/1994 | Hebert |
| 5,376,786 A | 12/1994 | MacDonald |
| 5,382,955 A | 1/1995 | Knierim |
| 5,387,887 A | 2/1995 | Zimmerman et al. |
| 5,408,485 A | 4/1995 | Ries |
| 5,413,047 A | 5/1995 | Evans et al. |
| 5,416,628 A | 5/1995 | Betti et al. |
| 5,418,637 A | 5/1995 | Kuo |
| 5,424,680 A | 6/1995 | Nazarathy et al. |
| 5,428,643 A | 6/1995 | Razzell |
| 5,428,831 A | 6/1995 | Monzello et al. ............ 455/296 |
| 5,436,752 A | 7/1995 | Wedding |
| 5,436,756 A | 7/1995 | Knox et al. |
| 5,444,864 A | 8/1995 | Smith .......................... 455/84 |
| 5,450,044 A | 9/1995 | Hulick |
| 5,481,389 A | 1/1996 | Pidgeon et al. |
| 5,481,568 A | 1/1996 | Yada |
| 5,483,552 A | 1/1996 | Shimazaki et al. ........... 375/233 |
| 5,504,633 A | 4/1996 | Van Den Enden |
| 5,510,919 A | 4/1996 | Wedding |
| 5,515,196 A | 5/1996 | Kitajima et al. |
| 5,528,710 A | 6/1996 | Burton et al. |
| 5,541,955 A | 7/1996 | Jacobsmeyer ............... 375/222 |
| 5,548,253 A | 8/1996 | Durrant |
| 5,557,439 A | 9/1996 | Alexander et al. .......... 359/130 |
| 5,574,743 A | 11/1996 | van der Poel et al. |
| 5,574,978 A | 11/1996 | Talwar et al. |
| 5,589,786 A | 12/1996 | Bella et al. |
| 5,604,724 A | 2/1997 | Shiokawa |
| 5,606,734 A | 2/1997 | Bahu .......................... 455/303 |
| 5,612,653 A | 3/1997 | Dodds et al. |
| 5,617,135 A | 4/1997 | Noda et al. .................... 348/12 |
| 5,621,764 A | 4/1997 | Ushirokawa et al. |
| 5,625,360 A | 4/1997 | Garrity et al. |
| 5,625,722 A | 4/1997 | Froberg et al. |
| 5,640,417 A * | 6/1997 | Barabash et al. ............. 375/222 |
| 5,644,325 A | 7/1997 | King et al. |
| 5,648,987 A | 7/1997 | Yang et al. .................. 375/232 |
| 5,670,871 A | 9/1997 | Man et al. |
| 5,675,600 A | 10/1997 | Yamamoto |
| 5,678,198 A | 10/1997 | Lemson |
| 5,689,356 A | 11/1997 | Rainal |
| 5,691,978 A | 11/1997 | Kenworthy .................. 370/278 |
| 5,692,011 A | 11/1997 | Nobakht et al. .............. 375/233 |
| 5,699,022 A | 12/1997 | Tovar ........................... 333/18 |
| 5,706,008 A | 1/1998 | Huntley et al. |
| 5,721,315 A | 2/1998 | Evans et al. |
| 5,723,176 A | 3/1998 | Keyworth et al. |
| 5,751,726 A | 5/1998 | Kim |
| 5,754,681 A | 5/1998 | Watanabe et al. |
| 5,757,763 A | 5/1998 | Green et al. |
| 5,761,243 A | 6/1998 | Russell et al. |
| 5,764,542 A | 6/1998 | Gaudette et al. |
| 5,774,505 A | 6/1998 | Baugh ........................ 375/348 |
| 5,783,630 A | 7/1998 | Evans et al. |
| 5,784,032 A | 7/1998 | Johnston et al. |
| 5,790,595 A | 8/1998 | Benthin et al. |
| 5,798,854 A | 8/1998 | Blauvelt et al. |
| 5,801,657 A | 9/1998 | Fowler et al. |
| 5,802,089 A | 9/1998 | Link |
| 5,812,578 A | 9/1998 | Schemmann et al. |
| 5,825,211 A | 10/1998 | Smith et al. |
| 5,825,257 A | 10/1998 | Klymyshyn et al. |
| 5,825,825 A | 10/1998 | Altmann et al. |
| 5,828,329 A | 10/1998 | Burns |
| 5,835,848 A | 11/1998 | Bi et al. ....................... 455/24 |
| 5,839,105 A | 11/1998 | Ostendorf et al. |
| 5,841,841 A | 11/1998 | Dodds et al. |
| 5,844,436 A | 12/1998 | Altmann |
| 5,848,139 A | 12/1998 | Grover |
| 5,850,409 A | 12/1998 | Link |
| 5,850,505 A | 12/1998 | Grover et al. |
| 5,852,389 A | 12/1998 | Kumar et al. |
| 5,859,862 A | 1/1999 | Hikasa et al. |
| 5,861,966 A | 1/1999 | Ortel |
| 5,872,468 A | 2/1999 | Dyke |
| 5,878,390 A | 3/1999 | Kawai et al. |
| 5,880,870 A | 3/1999 | Sieben et al. |

| | | | | | | |
|---|---|---|---|---|---|---|
| 5,883,910 A | 3/1999 | Link | | 6,288,668 B1 | 9/2001 | Tsukamoto et al. |
| 5,887,022 A | 3/1999 | Lee et al. | | 6,289,055 B1 | 9/2001 | Knotz |
| 5,889,759 A | 3/1999 | McGibney | | 6,289,151 B1 | 9/2001 | Kazarinov et al. |
| 5,896,392 A | 4/1999 | Ono et al. | | 6,295,325 B1 | 9/2001 | Farrow et al. ............ 375/327 |
| 5,912,749 A | 6/1999 | Harstead et al. | | 6,298,459 B1 | 10/2001 | Tsukamoto |
| 5,920,600 A | 7/1999 | Yamaoka et al. | | 6,304,199 B1 | 10/2001 | Fang et al. |
| 5,923,226 A | 7/1999 | Kakura et al. | | 6,311,045 B1 | 10/2001 | Domokos ................. 455/78 |
| 5,942,576 A | 8/1999 | Evans et al. | | 6,313,713 B1 | 11/2001 | Ho et al. ................... 333/1.1 |
| 5,943,380 A | 8/1999 | Marchesani et al. | | 6,317,247 B1 | 11/2001 | Yang et al. ............... 359/245 |
| 5,943,457 A | 8/1999 | Hayward et al. | | 6,317,469 B1 | 11/2001 | Herbert |
| 5,949,926 A | 9/1999 | Davies | | 6,341,023 B1 | 1/2002 | Puc |
| 5,959,032 A | 9/1999 | Evans et al. | | 6,356,374 B1 | 3/2002 | Farhan .................... 359/180 |
| 5,959,750 A | 9/1999 | Eskildsen et al. | | 6,388,786 B1 | 5/2002 | Ono et al. |
| 5,965,667 A | 10/1999 | Evans et al. | | 6,411,117 B1 | 6/2002 | Hatamian ................. 324/765 |
| 5,968,198 A | 10/1999 | Hassan et al. | | 6,421,155 B1 | 7/2002 | Yano |
| 5,978,417 A | 11/1999 | Baker et al. ............... 375/232 | | 6,445,476 B1 | 9/2002 | Kahn et al. ............... 359/184 |
| 5,983,178 A | 11/1999 | Naito et al. | | 6,473,131 B1 | 10/2002 | Neugebauer et al. |
| 5,985,999 A | 11/1999 | Dominguez et al. | | 6,501,792 B2 | 12/2002 | Webster |
| 5,999,300 A | 12/1999 | Davies et al. | | 6,539,204 B1 | 3/2003 | Marsh et al. ............... 455/63 |
| 6,002,274 A | 12/1999 | Smith et al. | | 6,560,257 B1 | 5/2003 | DeSalvo et al. .......... 372/38.02 |
| 6,002,717 A | 12/1999 | Gaudet | | 6,650,189 B1 | 11/2003 | Romao |
| 6,009,424 A | 12/1999 | Lepage et al. | | 6,665,348 B1 | 12/2003 | Feher ...................... 375/259 |
| 6,011,952 A | 1/2000 | Dankberg et al. ............ 455/24 | | 6,665,500 B2 | 12/2003 | Snawerdt |
| 6,021,110 A | 2/2000 | McGibney | | 6,718,138 B1 | 4/2004 | Sugawara |
| 6,028,658 A | 2/2000 | Hamada et al. | | 6,751,587 B2 | 6/2004 | Thyssen et al. ............. 704/228 |
| 6,031,048 A | 2/2000 | Evans et al. | | 6,816,101 B2 | 11/2004 | Hietala et al. .............. 341/155 |
| 6,031,866 A | 2/2000 | Oler et al. | | 6,819,166 B1 | 11/2004 | Choi et al. ................. 327/551 |
| 6,031,874 A | 2/2000 | Chennakeshu et al. | | 6,819,943 B2 | 11/2004 | Dalal |
| 6,034,996 A | 3/2000 | Herzberg | | 6,920,315 B1 | 7/2005 | Wilcox et al. |
| 6,035,080 A | 3/2000 | Henry et al. | | 6,961,019 B1 | 11/2005 | McConnell et al. ...... 342/357.1 |
| 6,041,299 A | 3/2000 | Schuster et al. | | 7,123,676 B2 | 10/2006 | Gebara et al. |
| 6,052,420 A | 4/2000 | Yeap et al. ................ 375/346 | | 7,149,256 B2 | 12/2006 | Vrazel et al. |
| 6,072,364 A | 6/2000 | Jeckeln et al. | | 7,173,551 B2 | 2/2007 | Vrazel et al. |
| 6,072,615 A | 6/2000 | Mamyshev | | 7,212,580 B2 | 5/2007 | Hietala et al. |
| 6,078,627 A | 6/2000 | Crayford | | 7,215,721 B2 | 5/2007 | Hietala et al. |
| 6,084,931 A | 7/2000 | Powell, II et al. | | 7,307,569 B2 | 12/2007 | Vrazel et al. |
| 6,091,782 A | 7/2000 | Harano | | 2001/0024542 A1 | 9/2001 | Aina et al. ................. 385/24 |
| 6,093,496 A | 7/2000 | Dominguez et al. | | 2002/0086640 A1 | 7/2002 | Belcher et al. ............. 455/63 |
| 6,093,773 A | 7/2000 | Evans et al. | | 2002/0196508 A1 | 12/2002 | Wei et al. |
| 6,108,474 A | 8/2000 | Eggleton et al. | | 2003/0002121 A1 | 1/2003 | Miyamoto et al. |
| 6,111,477 A | 8/2000 | Klymyshyn et al. | | 2003/0007631 A1 | 1/2003 | Bolognesi et al. |
| 6,118,563 A | 9/2000 | Boskovic et al. | | 2003/0008628 A1 | 1/2003 | Lindell et al. .............. 455/180 |
| 6,118,567 A | 9/2000 | Alameh et al. | | 2003/0030876 A1 | 2/2003 | Takei ....................... 359/187 |
| 6,127,480 A | 10/2000 | Dominguez et al. | | 2003/0053534 A1 | 3/2003 | Sivadas et al. ............. 375/229 |
| 6,140,416 A | 10/2000 | Evans et al. | | 2003/0058976 A1 | 3/2003 | Ohta et al. ................. 375/350 |
| 6,140,858 A | 10/2000 | Dumont | | 2003/0063354 A1 | 4/2003 | Davidson .................. 359/189 |
| 6,140,972 A | 10/2000 | Johnston et al. | | 2003/0067990 A1 | 4/2003 | Bryant ...................... 375/259 |
| 6,141,127 A | 10/2000 | Boivin et al. | | 2004/0053578 A1 | 3/2004 | Grabon et al. |
| 6,141,387 A | 10/2000 | Zhang | | 2004/0105462 A1 | 6/2004 | Kim et al. |
| 6,148,428 A | 11/2000 | Welch et al. | | 2004/0114888 A1 | 6/2004 | Rich et al. |
| 6,151,150 A | 11/2000 | Kikuchi | | 2004/0197103 A1 | 10/2004 | Roberts et al. ............. 398/159 |
| 6,154,301 A | 11/2000 | Harvey | | 2004/0213354 A1 | 10/2004 | Jones et al. ................ 375/285 |
| 6,163,638 A | 12/2000 | Eggleton et al. | | 2004/0218756 A1 | 11/2004 | Tang et al. ................. 379/417 |
| 6,169,764 B1 | 1/2001 | Babanezhad ............... 375/233 | | 2005/0069063 A1 | 3/2005 | Waltho et al. .............. 375/346 |
| 6,169,912 B1 | 1/2001 | Zuckerman ................ 455/570 | | 2005/0180520 A1 | 8/2005 | Kim et al. |
| 6,181,454 B1 | 1/2001 | Nagahori et al. | | 2006/0146966 A1 | 7/2006 | Golanbari et al. |
| 6,191,719 B1 | 2/2001 | Bult et al. | | 2006/0159002 A1 | 7/2006 | Kim et al. |
| 6,201,916 B1 | 3/2001 | Eggleton et al. | | 2006/0178157 A1 | 8/2006 | Gebara et al. |
| 6,208,792 B1 | 3/2001 | Hwang et al. | | 2006/0291598 A1 | 12/2006 | Gebara et al. |
| 6,211,978 B1 | 4/2001 | Wojtunik ................... 359/114 | | 2007/0060059 A1 | 3/2007 | Kim et al. |
| 6,212,654 B1 | 4/2001 | Lou et al. | | 2007/0064923 A1 | 3/2007 | Schmukler et al. |
| 6,214,914 B1 | 4/2001 | Evans et al. | | 2007/0092265 A1 | 4/2007 | Vrazel et al. |
| 6,219,633 B1 | 4/2001 | Lepage | | 2007/0253495 A1 | 11/2007 | Kim |
| 6,222,861 B1 | 4/2001 | Kuo et al. ................... 372/20 | | | | |
| 6,226,112 B1 | 5/2001 | Denk et al. | | | FOREIGN PATENT DOCUMENTS | |
| 6,236,963 B1 | 5/2001 | Naito et al. | | | | |
| 6,259,836 B1 | 7/2001 | Dodds | | EP | 0 584 865 B1 | 3/2000 |
| 6,259,847 B1 | 7/2001 | Lenz et al. | | GB | 2 223 369 A | 4/1990 |
| 6,268,816 B1 | 7/2001 | Bult et al. | | GB | 2 306 066 A | 4/1997 |
| 6,271,690 B1 | 8/2001 | Hirano et al. | | JP | 62082659 | 10/1988 |
| 6,271,944 B1 | 8/2001 | Schemmann et al. | | JP | 1990000063162 | 11/1991 |
| 6,281,824 B1 | 8/2001 | Masuda | | JP | 04187738 | 7/1992 |
| 6,285,709 B1 | 9/2001 | Alelyunas et al. | | JP | 08079186 A | 3/1996 |

| | | |
|---|---|---|
| WO | WO 99/45683 | 9/1999 |
| WO | WO 01/41346 A2 | 6/2001 |
| WO | WO 02/067521 A1 | 8/2002 |
| WO | WO 02/082694 A1 | 10/2002 |
| WO | WO 02/091600 A2 | 11/2002 |
| WO | WO 03/071731 A1 | 8/2003 |
| WO | WO 03/077423 A2 | 9/2003 |
| WO | WO 03/092237 A1 | 11/2003 |
| WO | WO 2004/008782 A2 | 1/2004 |
| WO | WO 2004/045078 A2 | 5/2004 |
| WO | WO 2004/088857 A2 | 10/2004 |
| WO | WO 2005/018134 A2 | 2/2005 |
| WO | WO 2005/050896 A2 | 6/2005 |

OTHER PUBLICATIONS

Borjak et al.; High-Speed Generalized Distributed-Amplifier-Based Transversal-Filter Topology for Optical Communication Systems; IEEE Transactions on Microwave Theory and Techniques; vol. 45, No. 8; Aug. 1997; pp. 1453-1457.

Buchali et al.; Fast Eye Monitor for 10 Gbit/s and its Application for Optical PMD Compensation; Optical Society of America; (2000); pp. TuP5-1-TuP1-3.

Cartledge et al.; Performance of Smart Lightwave Receivers With Linear Equalization; Journal of Lightwave Technology; vol. 10, No. 8; Aug. 1992; pp. 1105-1109.

Cimini et al.; Can Multilevel Signaling Improve the Spectral Efficiency of ASK Optical FDM Systems?; IEEE Transactions on Communications; vol. 41, No. 7; Jul. 1993; pp. 1084-1090.

Downie et al.; Performance Monitoring of Optical Networks with Synchronous and Asynchronous Sampling; p. WDD50-1.

Enning et al.; Design and Test of Novel Integrate and Dump Filter (I&D) for Optical Gbit/s System Applications; Electronics Letters; (Nov. 21, 1991); vol. 27, No. 24; pp. 2286-2288.

Godin et al.; A InP DHBT Technology for High Bit-rate Optical Communications Circuits; IEEE; (1997); pp. 219-222.

Haskins et al.; FET Diode Linearizer Optimization for Amplifier Predistortion in Digital Radios; IEEE Microwave and Guided Wave Letters; vol. 10, No. 1; Jan. 2000; pp. 21-23.

Hranilovic et al.; A Multilevel Modulation Scheme for High-Speed Wireless Infrared Communications; IEEE; (1999); pp. VI-338-VI-341.

Jutzi, Wilhelm; Microwave Bandwidth Active Transversal Filter Concept with MESFETs; IEEE Transactions on Microwave Theory and Technique, vol. MTT-19, No. 9; Sep. 1971; pp. 760-767.

Lee et al.; Effects of Decision Ambiguity Level on Optical Receiver Sensitivity; IEEE Photonics Technology Letters; vol. 7, No. 19; Oct. 1995; pp. 1204-1206.

D. Marcuse; Calculation of Bit-Error Probability for a Lightwave System with Optical Amplifiers and Post-Detection Gaussian Noise; Journal of Lightwave Technology; vol. 9, No. 4; Apr. 1991; pp. 505-513.

Megherbi et al.; A GaAs-HBT A/D Gray-code converter; IEEE; (1997); pp. 209-212.

Nazarathy et al.; Progress in Externally Modulated AM CATV Transmission Systems; Journal of Lightwave Technology; vol. 11, No. 1; Jan. 1993; pp. 82-105.

Oehler et al.; A 3.6 Gigasample/s 5 bit Analog to Digital Converter Using 0.3 μm AlGaAs-HEMT Technology; IEEE; (1993); pp. 163-164.

Ota et al.; High-Speed, Burst-Mode, Packet-Capable Optical Receiver and Instantaneous Clock Recovery for Optical Bus Operation; Journal of Lightwave Technology; vol. 12, No. 2; Feb. 1994; pp. 325-331.

Poulton et al.; An 8-Gsa/s 8-bit ADC System; Symposium on VLSI Circuits Digest of Technical Papers; (1997); pp. 23-24.

Poulton et al.; A 6-b, 4 Gsa/s GaAs HBT ADC; IEEE Journal of Solid-State Circuits; vol. 30, No. 10.; Oct. 1995; pp. 1109-1118.

Poulton et al.; A 6-bit, 4 Gsa/s ADC Fabricated in a GaAs HBT Process; IEEE; (1994); pp. 240-243.

Prasetyo et al.; Application for Amplitude Gain Estimation Techniques for Multilevel Modulation in OFDM Systems; IEEE; (1998); pp. 821-824.

Shtaif et al.; Limits on the Spectral Efficiency of Intensity Modulated Direct Detection Systems with Optical Amplifiers; AT&T Labs Research; pp. MM1-1-MM1-3.

Su et al.; Inherent Transmission Capacity Penalty of Burst-Mode Receiver for Optical Multiaccess Networks; IEEE Photonics Technology Letters; vol. 6, No. 5; May 1994; pp. 664-667.

Wang et al.; Multi-Gb/s Silicon Bipolar Clock Recovery IC; IEEE Journal on Selected Areas in Communications; vol. 9, No. 5; Jun. 1991; pp. 656-663.

Webb, William T.; Spectrum Efficiency of Multilevel Modulation Schemes in Mobile Radio Communications; IEEE Transactions on Communications; vol. 43, No. 8; Aug. 1995; pp. 2344-2349.

Wedding et al.; Fast Adaptive Control for Electronic Equalization of PMD; Optical Society of America; (2000); pp. TuP4-1-TuP4-3.

Wilson et al.; Predistortion of Electroabsorption Modulators for Analog CATV Systems at 1.55 μm; Journal of Lightwave Technology; vol. 15, No. 9; Sep. 1997; pp. 1654-1662.

Author: Unknown; Digital Carrier Modulation Schemes; Title: Unknown; Date: Unknown; pp. 380-442.

International Search Report dated Sep. 26, 2002; International Application No. PCT/US02/14459.

Fürst et al.; *Performance Limits of Nonlinear RZ and NRZ Coded Transmission at 10 and 40 Gb/s on Different Fibers*; pp. 302-304; (Year: 2000).

Garrett, Ian; *Pulse-Position Modulation for Transmission Over Optical Fibers with Direct or Heterodyne Detection*; IEEE Transactions on Communications; vol. COM-31; No. 4; Apr. 1983; pp. 518-527.

Idler et al.; *40 Gbit/s Quaternary Dispersion Supported Transmission Field Trial Over 86 km Standard Singlemode Fibre*; 24th European Conference on Optical Communication; Sep. 1998; pp. 145-147.

Ohtsuki et al.; *BER Performance of Turbo-Coded PPM CDMA Systems on Optical Fiber*; Journal of Lightwave Technology; vol. 18; No. 12; Dec. 2000; pp. 1776-1784.

Vorenkamp et al.; *A 1 Gs/s, 10b Digital-to-Analog Converter*; ISSCC94/Session 3/Analog Techniquest/Paper WP 3.3; pp. 52-53; (Year: 1994).

Walkin et al.; *A 10 Gb/s 4-ary ASK Lightwave System*; ECOC; 1997; pp. 255-258.

Walklin et al.; *Multilevel Signaling for Extending the Dispersion-Limited Transmission in High-Speed, Fiber Optic Communication Systems*; IEEE; 1996; pp. 233-236.

Walklin et al.; *Multilevel Signaling for Increasing the Reach of 10 Gb/s Lightwave Systems*; IEEE Journal of Lightwave Technology; vol. 17; No. 11; Nov. 1999; pp. 2235-2248.

Wedding et al.; *Multi-level Dispersion Supported Transmission at 20 Gbit/s Over 46 km Installed Standard Singlemode Fibre*; 22nd European Conference on Optical Communication; 1996; pp. 91-94.

International Search Report dated May 29, 2003 for International Application No. PCT/US03/04626.

Chi et al.; *Transmission Performance of All-Optically Labelled Packets Using ASK/DPSK Orthogonal Modulation*; The 15th Annual Meeting of the IEEE Lasers and Electro-Optics Society, 2002; LEOS 2002; Nov. 10-14, 2002; vol. 1:51-52. The whole document.

Chiang et al.; *Implementation of STARNET: A WDM Computer Communications Network*; IEEE Journal on Selected Areas in Communications; Jun. 1996; vol. 14, No. 5; pp. 824-839.

Kaess et al.; *New Encoding Scheme for High-Speed Flash ADC's*; IEEE International Symposium on Circuits and Systems; Jun. 9-12, 1997; Hong Kong; pp. 5-8.

Kaiser et al.; *Reduced Complexity Optical Duobinary 10-Gb/s Transmitter Setup Resulting in an Increased Transmission Distance*; IEEE Photonics Technology Letters; Aug. 2001; vol. 13; No. 8; pp. 884-886.

Ohm et al.; *Quaternary Optical ASK-DPSK and Receivers with Direct Detection*; IEEE Photonics Technology Letters; Jan. 2003; vol. 15, No. 1; pp. 159-161.

Runge et al.; *High-Speed Circuits for Lightwave Communications*; 1999; World Scientific, pp. 181-184.

Vodhanel et al.; *Performance of Directly Modulated DFB Lasers in 10-Gb/s ASK, FSK, and DPSK Lightwave Systems*; Journal of Lightwave Technology; Sep. 1990; vol. 8, No. 9; pp. 1379-1386.

Wakimoto et al.; *Si Bipolar 2-GHz 6-bit Flash A/D Conversion LSI*; IEEE Journal of Solid-State Circuits; Dec. 1988; vol. 23, No. 6; pp. 1345-1350.

Westphal et al.; *Lightwave Communications*; 1994; Thursday Afternoon/CLEO '94; pp. 337-338.

Choi et al.; *A 0.18-µm CMOS 3.5-Gb/s Continuous-Time Adaptive Cable Equalizer Using Enhanced Low-Frequency Gain Control Method*; IEEE Journal of Solid-State Circuits; Mar. 2004; vol. 39, No. 3; pp. 419-425.

Paul, et al.; *3 Gbit/s Optically Preamplified Direct Detection DPSK Receiver With 116 photon/bit Sensitivity*; Electronics Letters; vol. 29, No. 7; Apr. 1, 1993; pp. 614-615.

Penninckx et al.; *Optical Differential Phase Shift Keying (DPSK) Direct Detection Considered as a Duobinary Signal*; Proc. 27$^{th}$ Eur. Conf. on Opt. Comm. (ECOC'01—Amsterdam); vol. 3; Sep. 30 to Oct. 4, 2001; pp. 456-457.

Rohde et al.; *Robustness of DPSK Direct Detection Transmission Format in Standard Fibre WDM Systems*; Electronics Letters; vol. 36, No. 17; Aug. 17, 2000; pp. 1483-1484.

Shirasaki et al.; *Fibre Transmission Properties of Optical Pulses Produced Through Direct Phase Modulation of DFB Laser Diode*; Electronics Letters; vol. 24, No. 8; Apr. 14, 1988; pp. 486-488.

Weger et al.; *Gilbert Multiplier as an Active Mixer with Conversion Gain Bandwidth of up to 17GHz*; Electronics Letters; Mar. 28, 1991; vol. 27, No. 7; pp. 570-571.

Kannangara et al.; *Adaptive Duplexer for Multiband Transreceiver*; Radio and Wireless Conference; Aug. 10-13, 2003; RAWCON '03; pp. 381-384.

Kannangara et al.; *Adaptive Duplexer for Software Radio*; Approximate Date: Nov. 11-13, 2002.

Kannangara et al.; *An Algorithm to Use in Adaptive Wideband Duplexer for Software Radio*; IEICE Transactions on Communications; Dec. 2003; vol. E86-B, No. 12; pp. 3452-3455.

Kannangara et al.; *Performance Analysis of the Cancellation Unit in an Adaptive Wideband Duplexer for Software Radio*; ATcrc Telecommunications and Networking Conference & Workshop, Melbourne, Australia, Dec. 11-12, 2003.

Williamson et al., *Performance Analysis of Adaptive Wideband Duplexer*; 2003 Australian Telecommunications, Networks and Applications Conference (ATNAC); Dec. 8-10, 2003.

* cited by examiner

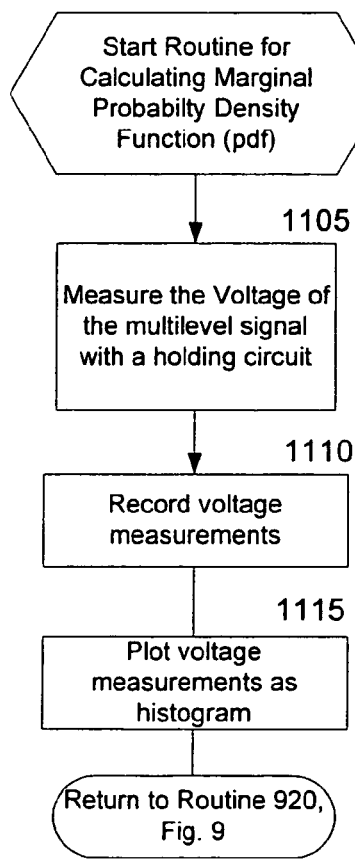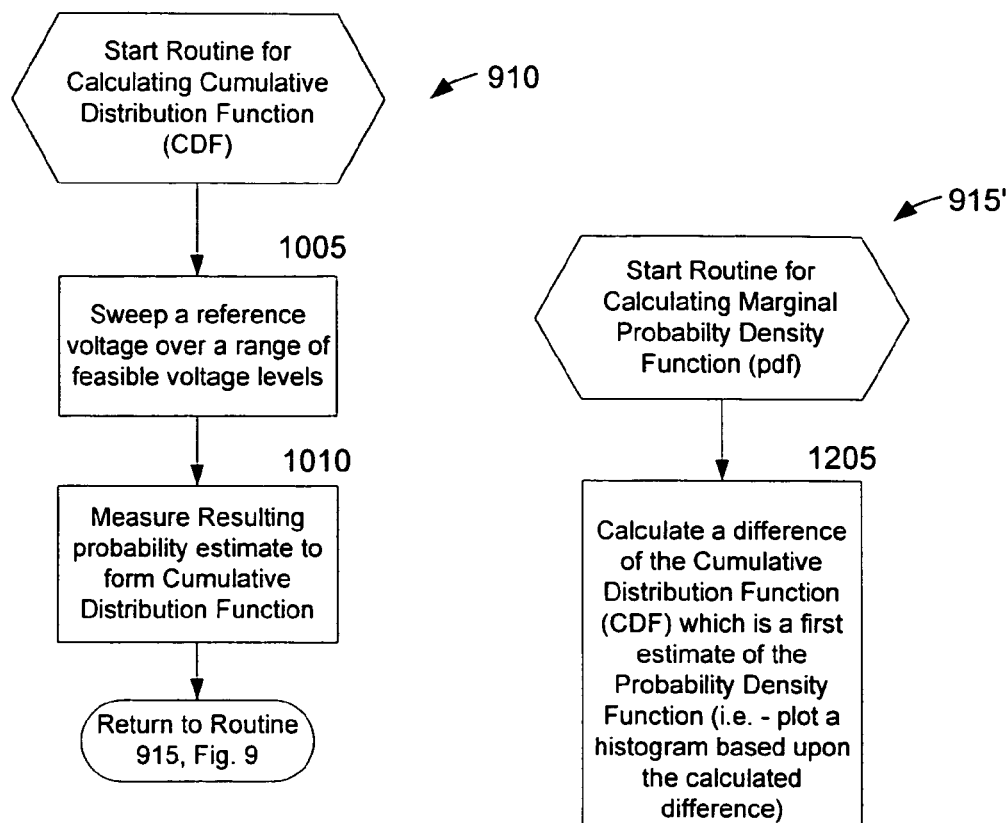
FIG. 10
FIG. 11
FIG. 12

METHOD AND SYSTEM FOR DECODING MULTILEVEL SIGNALS

STATEMENT REGARDING PRIORITY AND RELATED APPLICATIONS

This application is a continuation of and claims priority to application Ser. No. 10/108,598 filed Mar. 28, 2002, entitled "Method and System for Decoding Multilevel Signals." The entire contents of which are hereby incorporated by reference.

FIELD OF THE INVENTION

The present invention relates to optical fiber communication systems and increasing the throughput of data transmission over an optical fiber communication system through the use of multilevel modulation. Specifically, the present invention relates to a method and system for demodulating multilevel signals.

BACKGROUND OF THE INVENTION

The use of multilevel signals in an optical network architecture increases channel data throughput rates without requiring replacement of the existing optical fiber in a link (i.e., the optical fiber plant). While multilevel signals can offer this advantage of increased channel data throughput rates to an optical network architecture, conventional hardware and software used to decode the multilevel signal often cannot achieve this advantage because of difficulties in establishing thresholds by receivers for a multilevel signal. These thresholds are needed by the receiver to decode the multilevel signal into the one or more symbols that make up the multilevel signal.

The difficulties in establishing the thresholds are associated with reliably characterizing the noise that is present within a multilevel signal. Further, conventional hardware and software do not address multilevel signals comprising greater than two-level data streams. That is, the conventional art only provides methods for automatically controlling the threshold or decision points for traditional two-level data streams.

The voltage detection thresholds or decision points of multilevel receivers are usually centered in a statistical center of each of the troughs of a graphical representation of a marginal probability density function (pdf) that corresponds to the "eyes" of an "eye diagram" for a multilevel signal in order to minimize the number of decoding errors. Since the troughs or "eyes" of a pdf are usually not uniformly distributed in voltage, a simple conventional direct analog-to-digital conversion (ADC) at a minimum number of bits is not adequate for decoding a multilevel signal.

Conventional receivers for decoding two-level multilevel signals frequently assume additive noise with parametric noise distributions such as a Gaussian distribution. Conventional receivers for decoding two-level multilevel signals also usually assume simple linear dependencies on the transmitted two-level multilevel signal.

However, the noise in optical channels of a multilevel signal may have distributions that are non-Gaussian. Further, the distortion of multilevel signals may be nonlinear in nature resulting in asymmetric or multi-modal pdfs for the received signal.

In addition to the problems associated with estimating noise distributions in a multilevel signal, another problem exists in the conventional art with respect to reliably determining the fidelity of a received multilevel signal without the explicit transmission of a "testing" data sequence that is already known to the receiver. Conventional performance monitors can generally be categorized into one of two sets.

The first set are those that use a secondary threshold (or sampling phase) to approximately determine how often a received symbol is near to the primary threshold (or sampling phase) used for decoding. When the detected sample from this second threshold differs from the primary sample, a pseudo-error is said to have occurred. The link is then characterized with the pseudo-error rate. This class of approaches, however, neglects the fact that under optimal filtering, the primary and secondary samples will be heavily statistically correlated, and thus, misrepresents the link performance.

The second set of performance monitors of the conventional art are those that rely on acquiring statistics from an error correction module. Specifically, forward error correction coding is used at the transmitter to allow the receiver to correct a small number of errors. If the true number of errors incurred during transmission is sufficiently small, then the receiver can correct all of the errors and report the rate at which errors occur. This class of performance monitors, however, suffers two significant drawbacks.

First, these methods require the use of an error correction code so that errors can be detected. The second drawback is that transmission errors must occur in order to acquire statistics regarding their frequency of occurrence. By the very nature of the high quality of the link, these errors will rarely occur, and thus, the performance monitor requires a significant amount of time to reliably report the error rate.

In view of the foregoing, there exists a need in the art for a multilevel signal receiver that does not assume a particular noise distribution in a received multilevel signal. That is, a need exists in the art for a multilevel signal receiver that employs robust estimates of noise distributions in order to process complex signal distortions that may be present in a multilevel signal while maintaining high performance for classic Gaussian noise distributions that may also be present in a multilevel signal. Aspects include the need in the art for (1) a method and system for automatically selecting the decision thresholds for a multilevel signal receiver on an adaptive basis, (2) a multilevel signal receiver that can process multimodal conditional probability density functions, and (3) a method and system for decoding multilevel signals that can provide a reliable fidelity measure of the received signal without the transmission of explicit error testing sequences known to the receiver. In other words, a need exists in the art for a complete statistical characterization of link noise to reliably establish decision thresholds and infer error rates without suffering from the aforementioned drawbacks of the conventional art.

SUMMARY OF THE INVENTION

The present invention solves the aforementioned problems by providing a system and method for decoding multilevel signals. More specifically, the present invention is generally drawn to a method and system for selecting an optimal set of decision thresholds that can be used by an optical receiver in order to decode a multilevel optical signal. In one exemplary embodiment, the multilevel optical receiver can comprise a plurality of comparators that generally correspond with the number of levels in a multilevel data stream. Each comparator can be individually controlled and fed a decision threshold in order to decode a particular channel from a multilevel signal.

Unlike conventional optical receivers, the present invention can automatically control the thresholds or decision points for comparators of multilevel optical receivers that process multilevel data streams, where the noise corrupting the received signal is not necessarily Gaussian, signal independent, nor time-invariant. In other words, multilevel data streams can be distorted by noise where the noise follows a non-Gaussian probability distribution whose parameters depend on the transmitted signal values and vary with time. However, the present invention can still effectively process multilevel signals that have Gaussian, time-invariance, or signal-independence characteristics.

According to one aspect of the present invention, a multilevel optical receiver can comprise a plurality of voltage comparators, a decoder, a latch, an analog low-pass filter coupled to the latch, and a low-speed high resolution analog-to-digital converter coupled to the low-pass filter. With such structure, the multilevel optical receiver can generate an estimate of a cumulative distribution function (CDF) based on the received multilevel data signal.

The CDF can completely characterize the received multilevel data signal. From the CDF, the optical receiver can further generate an equivalent marginal probability density function (pdf) which is used to determine a near-optimal set of decision thresholds. A marginal pdf can be defined as an "overall" pdf characterizing the received signal when random symbols are transmitted. A marginal pdf can comprise one or more conditional pdfs. A conditional pdf is the pdf for an individual symbol of a multilevel signal, i.e. the pdf of the received signal conditioned on a particular symbol being transmitted.

Instead of using the calculated pdf to determine an optimal set of thresholds, the CDF function itself in one exemplary embodiment can be used to determine the decision thresholds as it conveys the same information as the pdf but in a less intuitive form. In either case, the invention can assist with centering the voltage detection thresholds for each of the plurality of comparators. In the pdf exemplary embodiment, the invention can center the voltage detection thresholds at the troughs or local minima of the pdf (or equivalently at the points of inflection of the CDF) which correspond to near-optimal decision thresholds for the received signal. In this way, the probability of error in the detection of the individual symbols that make-up multilevel signal can be minimized.

The centering of voltage detection thresholds based upon the calculated pdfs can involve several different steps. In one exemplary embodiment, a first step can comprise calculating an initial set of $\epsilon$-support estimates corresponding to ranges of received voltages of significant probability for receiving a particular symbol. Next, the $\epsilon$-support regions are combined until there is a 1-to-1 correspondence between the transmitted symbol levels and the $\epsilon$-support regions. Possible threshold candidates can then be determined by establishing the threshold between the $\epsilon$-support regions.

According to another aspect of the present invention, a multilevel optical receiver can comprise a plurality of voltage comparators, an analog low-pass filter, and a low-speed high resolution analog-to-digital converter coupled to the low-pass filter. According to this exemplary aspect, a latch that can be coupled to the low-pass filter has been removed. The removal of this latch can change the region of the signal that is being characterized. Specifically, latching the comparator output focuses the CDF/pdf characterization to the portion of the signal synchronized with the system clock and decision output. By removing the latch, the statistical characterization applies to the entire received signal and not just that portion which is used for the decision output.

For an alternative exemplary embodiment of the present invention, the CDF and pdf can be generated in a digital fashion (rather than the analog fashion described above) by using a track-and-hold circuit or a sample-and-hold circuit. The track-and-hold circuit or the sample-and-hold circuit can sample an input multilevel digital signal and accumulate the samples over time. These samples can then be digitally processed to provide either a marginal pdf or CDF. As before, the CDF or pdf may then be used to determine the decision threshold voltages.

According to another alternative exemplary embodiment of the present invention, a high-resolution analog-to-digital converter (ADC) can measure the voltage of the received multilevel signal. The digitized multilevel signal can be provided to a digital signal processor (DSP) which computes the pdf and decision thresholds. The DSP can then use the computed thresholds to decode subsequent symbols digitized from the multilevel signal.

Those skilled in the art will recognize that different hardware or software or both can be substituted for the exemplary embodiments described herein without departing from the scope and spirit of the present invention. Specifically, as long as the hardware or software (or both) performs the functions described herein, then those skilled in the art will appreciate that the present invention would be embodied in such alternative hardware or software or both.

A further aspect of the invention can include calculating the fidelity of a multilevel signal based upon an estimated marginal pdf. Specifically, the marginal pdf can be used to estimate a set of conditional pdfs (one for each candidate symbol of a multilevel signal). These conditional pdfs can then be used to estimate the probability of error for each symbol and hence the system as a whole. This aspect of the invention allows for error performance to be measured without explicit error tests that require testing sequences (known to the receiver) to be transmitted.

BRIEF DESCRIPTION OF THE DRAWINGS

FIG. 10 is an exemplary logic flow diagram illustrating a sub-method of FIG. 9 for calculating a cumulative distribution function according to an exemplary embodiment of the present invention.

FIG. 11 is an exemplary logic flow diagram illustrating a sub-method of FIG. 9 for calculating a marginal probability density function according to an exemplary embodiment of the present invention.

FIG. 12 is an exemplary logic flow diagram illustrating a sub-method of FIG. 9 for calculating a marginal probability density function according to alternate exemplary embodiment of the present invention.

FIG. 6 illustrates a graph of an exemplary initial pdf estimate for an N=16 level multilevel signal according to an exemplary embodiment of the present invention.

DETAILED DESCRIPTION OF EXEMPLARY EMBODIMENTS

Figure 1:
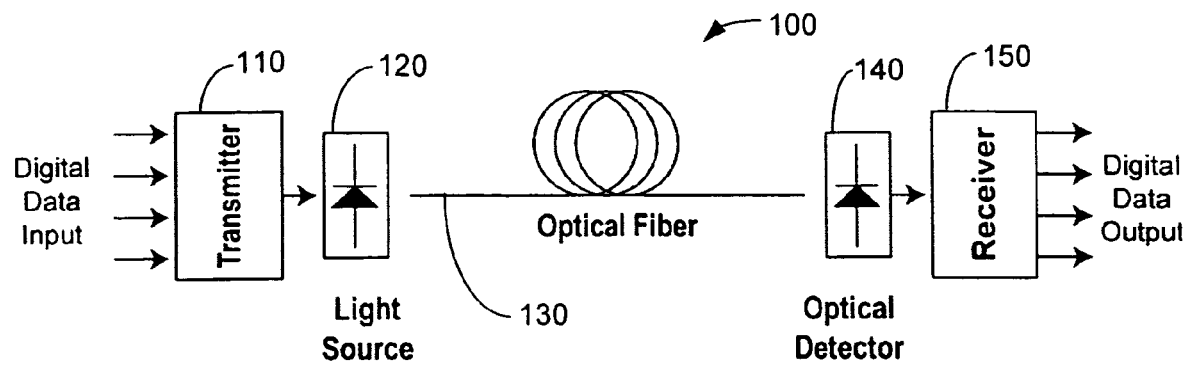
FIG. 1 is a bock diagram of a fiber optic link constructed in accordance with an exemplary multilevel optical signal system.

The present invention can select a near-optimal set of decision thresholds that can be used by an optical receiver in order to decode a multilevel optical signal. The multilevel optical receiver can comprise a plurality of comparators that generally correspond with the number of levels in a multilevel data stream. Each comparator can be individually controlled and fed a decision threshold in order to decode a particular symbol from a multilevel signal. Alternatively, a high-resolution analog-to-digital converter (ADC) can measure the voltage of the received multilevel signal. The digitized multilevel signal can be provided to a digital signal processor (DSP) which computes the pdf and decision thresholds. The DSP can then use the computed thresholds to decode subsequent digitized symbols from the multilevel signal.

The present invention typically does not require the assumption of Gaussianity, time-invariance, signal-independence, or binary signaling. Contrary to the conventional art, the invention is designed to perform well when these assumptions do not hold. However, the present invention can also perform well if the assumptions do hold or are valid.

A CDF can completely characterize the received multilevel signal data. From the CDF, the optical receiver can further generate an equivalent marginal probability density function (pdf) which is used to determine an optimal set of decision thresholds. A marginal pdf can be defined as an "overall" pdf characterizing the received signal when the symbol transmitted is unknown. A marginal pdf can comprise one or more conditional pdfs. A conditional pdf is the pdf for an individual symbol of a multilevel signal, i.e. the pdf of the received signal conditioned on a particular symbol being transmitted.

The determining of voltage detection thresholds based upon the calculated pdfs can involve several different steps. In one exemplary embodiment, a first step can comprise calculating an initial set of $\epsilon$-support estimates that comprise ranges of received voltages. Next, the $\epsilon$-support regions are combined until there is a 1-to-1 correspondence between the transmitted symbol levels and the $\epsilon$-support regions. Possible threshold candidates can then be determined by establishing the threshold between the $\epsilon$-support regions.

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a transmitter 110 that includes the circuitry necessary to modulate the light source 120 with the incoming multiple channel digital data input stream. The light source 120 is usually a laser in the form of a laser diode or an externally modulated laser source such as a Mach-Zehnder, or Electro-Absorptive modulator. The transmitter 110 takes a set of n high-speed digital binary inputs or channels and converts them to a single multilevel digital signal comprising $2^n$ levels at the same symbol rate (and thus an n times faster data rate) as the input data channels.

The exemplary optical network architecture 100 further comprises an optical waveguide 130 that can include one or more spans of optical fiber. The optical waveguide 130 couples the light source 120 to an optical detector 140. The optical detector 140 can be coupled to a receiver 150 that is responsible for decoding the multilevel signal into one or more channels of digital data output. The receiver 150 takes a single multilevel digital signal comprising $2^n$ levels at the same symbol rate and converts the multilevel signal into a set of n high-speed digital binary inputs or channels. The receiver 150 typically comprises all circuitry required to operate a corresponding optical detector 140 and to amplify the detected signal. Further details of the receiver 150 will be discussed below with respect to FIG. 2.

Figure 2:
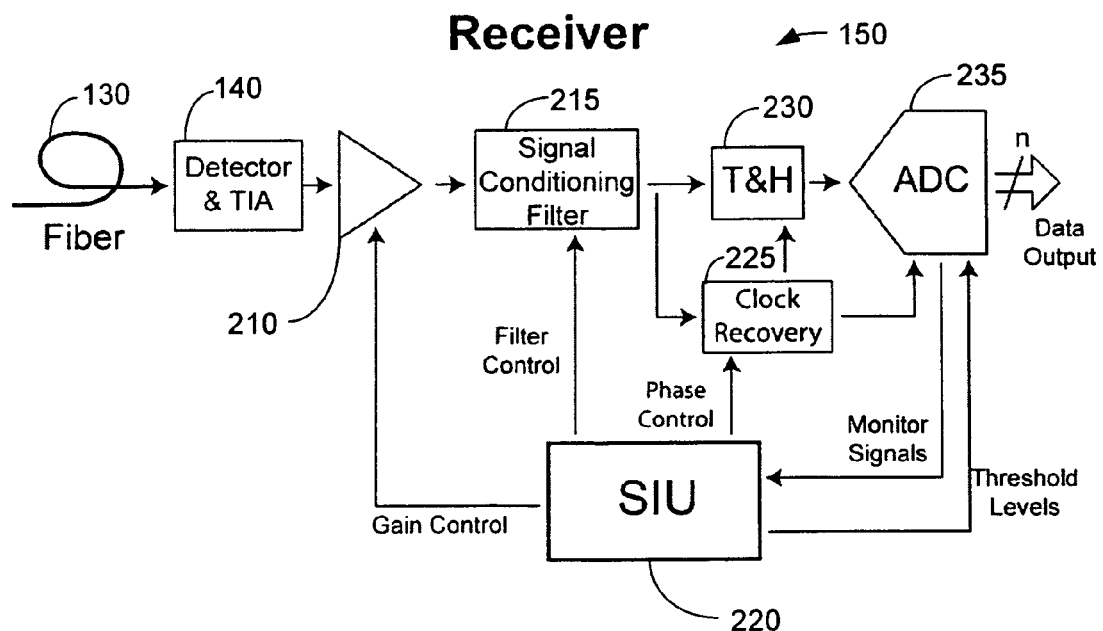
FIG. 2 is a block diagram of an exemplary multilevel optical receiver according to an exemplary embodiment of the present invention.

Referring now to FIG. 2, this figure illustrates a block diagram of an exemplary multilevel receiver 150 according to an exemplary embodiment of the present invention that can also be referred to as a desymbolizer. The receiver 150 can comprise an optical detector and TransImpedance Amplifier (TIA) circuitry 140. Usually, the TransImpedance Amplifier takes a very small electrical current output by the optical detector and converts it to a proportional voltage with a moderate intensity ("moderate" in the sense that it may still need further amplification). As noted above, the optical detector 140 coverts an optical signal into an electrical signal. The optical detector 140 is coupled to an amplifier 210 that feeds its output into a signal conditioning filter 215. The gain of the amplifier 210 can be controlled by a signal integrity unit (SIU) 220.

The optional signal conditioning filter 215 can comprise one or more programmable analog signal processing modules such as equalizers and filters. The signal conditioning filter 215 is also coupled to and controlled by the SIU 220. The SIU 220 can determine the decision or voltage thresholds that are used to decode the multilevel signal. Further details of various exemplary embodiments of the SIU 220 will be discussed below with respect to FIGS. 4, 5, and 7.

A clock recovery unit 225 can be coupled to the output of the amplifier 210 or an optional signal conditional filter 215. The clock recovery unit 225 can generate a timing signal that is used to operate an optional holding circuit 230 and an analog-to-digital converter (ADC) 235. The holding circuit 230 is not required for each of the exemplary embodiments. The holding circuit 230 can comprise one of a track-and-hold circuit or a sample-and-hold circuit as known to those skilled in the art. The holding circuit 230 is coupled to the output of the signal conditioning filter 215.

Coupled to the output of the optional holding circuit 230 is the ADC 235 which decodes the multilevel signal. The ADC 235 can convert a $2^n$-level signal into n binary data streams. Further details of various exemplary embodiments of the ADC 235 will be discussed below with respect to FIGS. 4, 5, and 7. The ADC 235 having a decoder 410 (not shown in FIG. 2) can convert a coded n-bit word each clock cycle into the corresponding n-bit word that was initially input into the transmitter 110. All of these functional blocks, less the optical detector and TIA circuitry 140 can be integrated into one circuit or on a multi-chip module.

Background on Multilevel Signals

Figure 3A:
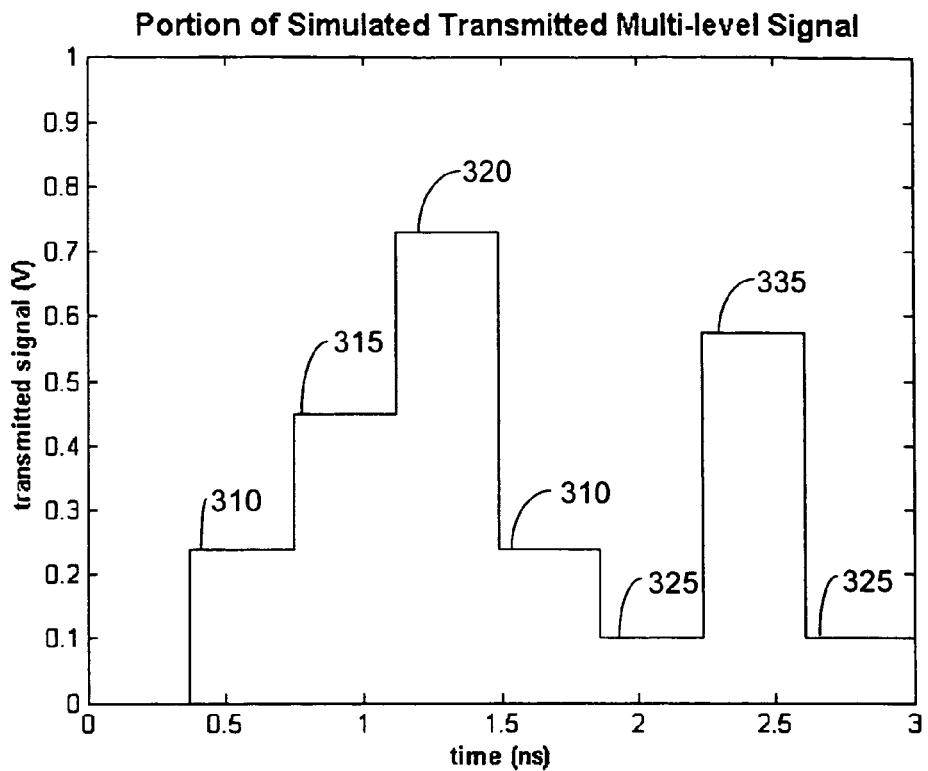
FIG. 3A is a diagram showing a representative example of an ideal 16-level signal.

FIG. 3A is a graph 300 depicting time versus voltage of an exemplary multilevel amplitude shift keying (ASK) signal 305 that combines four bits into a single transmitted pulse, or symbol, possessing one of 16 possible amplitude levels. While the present invention contemplates ASK signals, other modulation techniques are not beyond the scope of the present invention. Other modulation techniques include, but are not limited to, frequency shift keying (FSK), phase shift keying (PSK), quadrature amplitude modulation (QAM), and other like modulation techniques.

In FIG. 3A, five different amplitude values 310, 315, 320, 325, and 330 are shown. Associated with each amplitude value can be a unique n=4 bit word. For example, the amplitudes 310, 315, 320, 325, and 330 could be associated with the words "0010", "0101", "0111", "0001", and "0110". Specifically, associated with the first amplitude value 310 can be the four bit word of "0010." Associated with the second amplitude value 315, which is higher in voltage than the first value 310, can be the four bit word of "0101." Associated with the third amplitude value 320, which is higher in voltage than the second value 315, can be the four bit word of "0111." Associated with the fourth amplitude value 325, which is the lowest value out of all the values, can be the four bit word of "0001." And lastly, associated with the fifth amplitude value 330, which is between the second and third values 315 and 320, can be the four bit word of "0110." Those skilled in the art will appreciate that other words or assignments can be made for each amplitude value of a multilevel signal without departing from the scope and spirit of the present invention.

A multilevel signal allows for more than one bit to be transmitted per clock cycle, thereby improving the spectral efficiency of the transmitted signal. For multilevel optical transmission, some characteristic (i.e., signal property) of a transmitted pulse (such as amplitude, phase, frequency, etc.) is modulated over $2^n$ levels in order to encode n bits into the single pulse, thereby improving the spectral efficiency of the transmitted pulse. Multilevel modulation can increase aggregate channel throughput by combining n OOK data streams (each with bit rate, B, in bits/s) into one $2^n$-level signal (with a symbol rate, B, in symbols/s) for an aggregate throughput (in bits/s) that is n times greater than B. The aggregate data rate of the 16-level signal shown in FIG. 3 is four times greater than a corresponding OOK signal with a bit rate equal to the multilevel symbol rate. As the simplest case, OOK can be regarded as a two level multilevel signal where the symbol rate and bit rate are equal.

As a specific example, the assumption may be made that the 16-level signal in FIG. 3 has a symbol rate of 2.5 Gsym/s. That is, a pulse e.g., with one of 16 possible amplitudes (e.g. 310, 315, 320, 325, and 330) is transmitted at a rate of 2.5 Gigapulses/s. Therefore, the aggregate data rate of the 16-level signal is actually 10 Gb/s (4×2.5 Gb/s) because each pulse (i.e., symbol) can represent a distinct value of four bits. The optical components required to transmit and receive a 16-level 2.5 Gsym/s signal are nearly identical to those required for transmitting and receiving an OOK 2.5 Gb/s signal.

Exemplary Portion of a Simulated Received Multilevel Signal

Figure 3B:
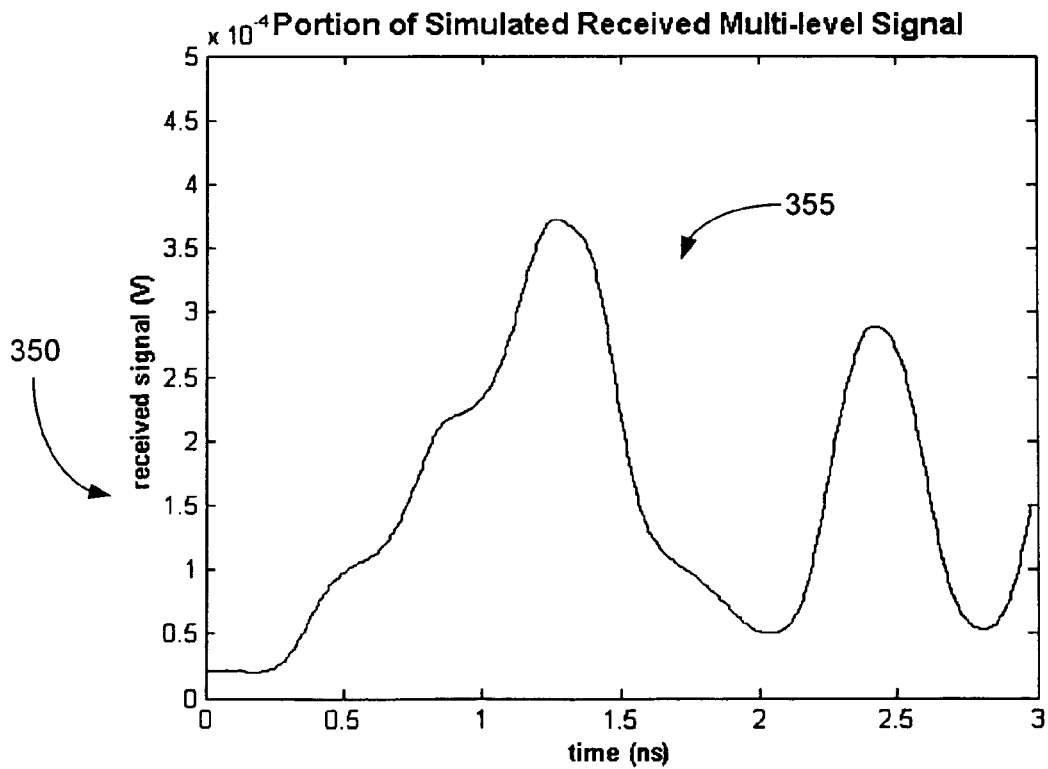
FIG. 3B is an exemplary simulated received signal displaying the signal in FIG. 3A transmitted through 80 km of optical fiber.

Referring now to FIG. 3B, this figure is a graph 350 of time versus voltage depicting an exemplary simulated received 16-level multilevel signal 355 that was propagated through 80 kilometers of optical fiber. The received 16-level multilevel signal 355 shown in FIG. 3B is an illustration of a segment covering eight symbols of the simulated waveform. The simulated waveform is based on 80 kilometers of fiber and an Avalanche PhotoDiode (APD). An APD can convert the optical signal to an electrical current whose amplitude is proportional to the received optical power. The simulated received multilevel signal 355 illustrates the challenge of directly determining the levels of each data stream contained in the signal.

Exemplary Eye-diagram for Received Multilevel Signal

Figure 3C:
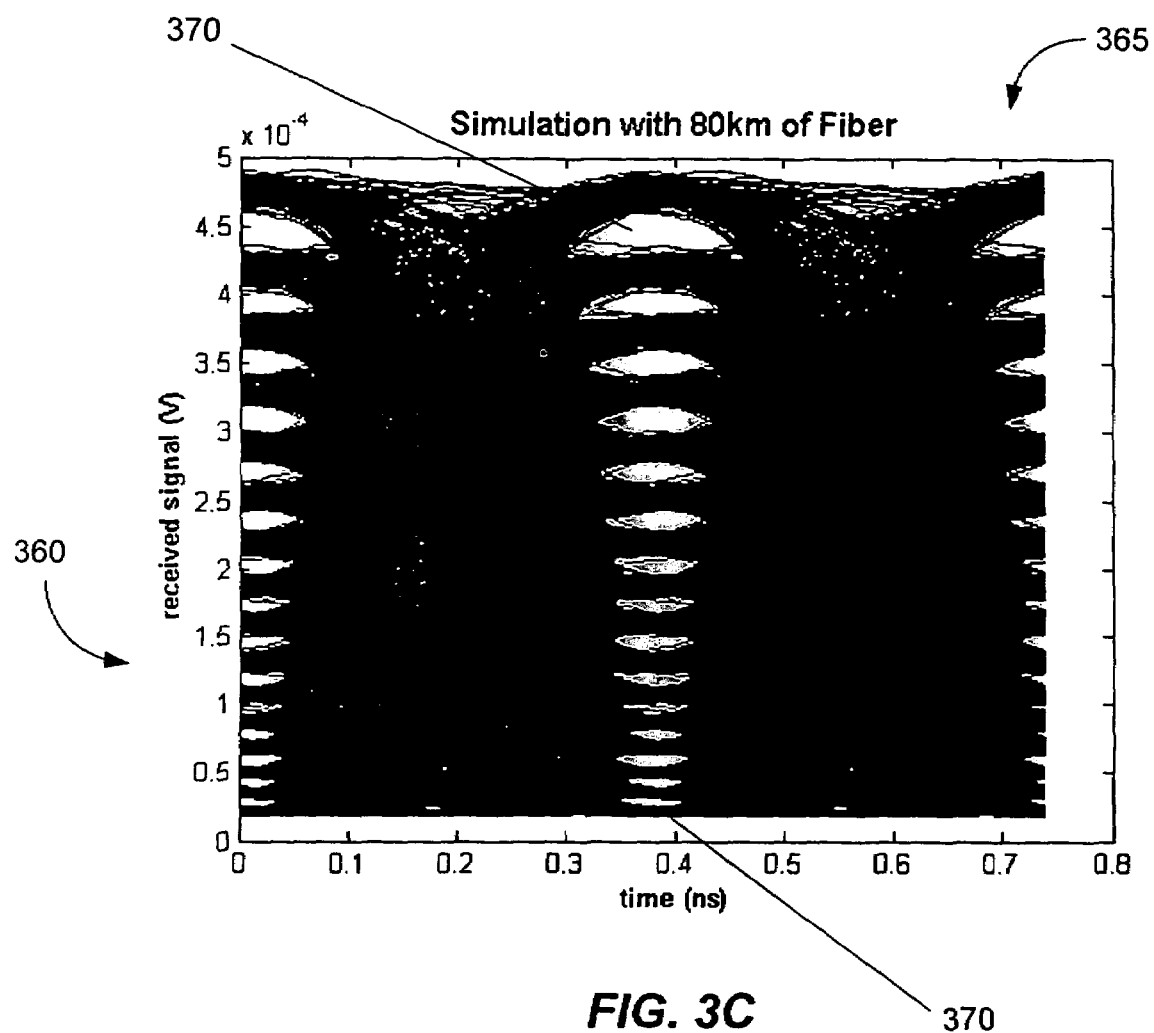
FIG. 3C illustrates an exemplary Eye-diagram for 4,096 simulated symbols received through 80 km of optical fiber.

Referring now to FIG. 3C, this figure is a graph 360 of time versus voltage depicting an exemplary "Eye"-diagram 365 for all 4,096 received symbols corresponding to the transmitted signal 305 of FIG. 3A. Eye diagram 365 comprises the complete data set with all symbol periods overlaid on one another. An Eye diagram/Eye pattern comprises the received signal displayed on an oscilloscope to show how distinct the received levels are. Often, an "open" eye 370 shows a good quality signal with clear differences between levels. A "closed" eye means that some levels could be confused for other levels, and therefore is a sign of a poor transmission system.

Eye diagram 365 illustrates the difficulty in determining the thresholds for multilevel data streams. From this simulation, it is apparent that the noise is signal dependent. Specifically, larger signal levels usually have a larger associated noise variance as is evidenced by the thickening of the eyelids towards the top of the eye-diagram 365. It is desired to have voltage detection thresholds centered in the statistical center of each of the 15 "eyes" 370. Furthermore, the eyes 370 are no longer uniformly distributed in voltage because the transmitter (with prior knowledge of the signal dependent noise variance) spaces the transmitted levels in a nonuniform manner in order to minimize the susceptibility to the noise and hence minimize the probability of error.

Because the transmitted levels are not uniformly spaced, a simple conventional direct ADC 235 at the minimum number of bits ($\log_2(16)=4$ in this case) is not adequate. Hypothetically, the received voltage signal could be digitized at a higher resolution (additional bits) and signal processing applied to determine the correct level. Unfortunately, at the targeted symbol rates of many optical systems (i.e. OC-192 at 10 Gb/s), this would require order-of-magnitude speed improvements of readily available ADC and signal processing technologies.

Exemplary Embodiments for Analog-to-digital Converters (ADCs) and Signal Integrity Units (SIUs)

Figure 4:
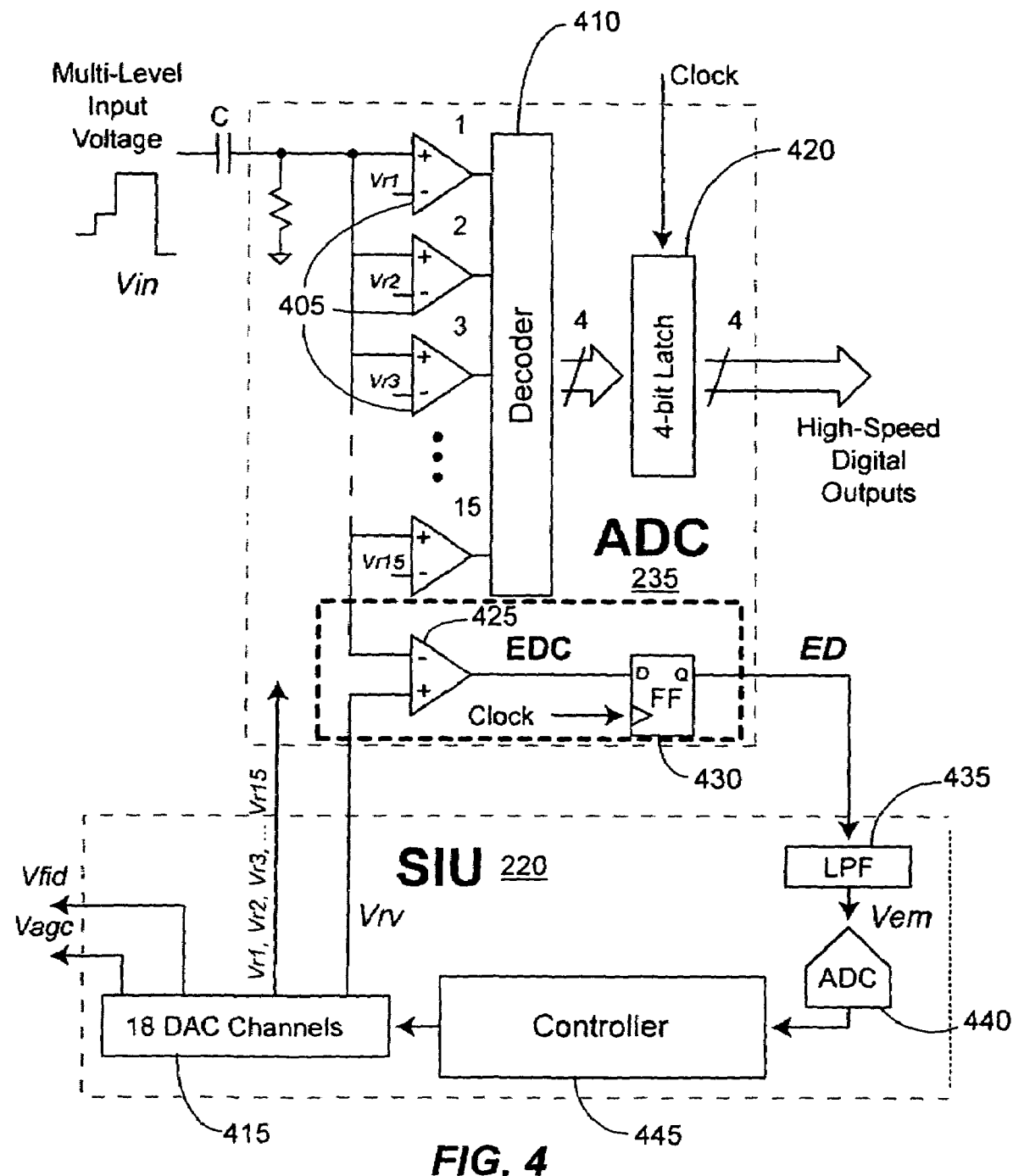
FIG. 4 illustrates a block diagram of an exemplary embodiment for a 16-level multilevel optical receiver.

Referring now to FIG. 4, this figure illustrates the details of an exemplary ADC 235 and a SIU 220. The ADC 235 may comprise a plurality of first comparators 405 connected in parallel to a decoder 410. The ADC 235 may be characterized as a high-speed low-resolution ADC that converts the received multilevel signal (symbols) into the associated transmitted data words or data channels. The threshold voltages of the comparators 405 are controlled by one or more digital-to-analog converters 415. The decoder 410 is coupled to an exemplary first latch 420 that may be four bit latch type. A second comparator 425 is connected in parallel with the first comparators 405. However, the second comparator 425 does not feed its output to the decoder 410. Instead, the output of the second comparator 425 is fed into a second optional latch 430 which is controlled by the clock signal. The subcircuit comprising the second comparator 425 and the optional latch 430 is referred to as the event-detection circuit (EDC), as illustrated in FIG. 4, since it produces a binary signal indicating if a particular event (in this case the event is whether $v_{rv}$ exceeds $v_{in}$ as discussed later) has occurred.

The comparator 425 used in the EDC should ideally be identical to and in the same environment as the first comparators 405. This will allow for the SIU to accurately determine threshold settings of the ADC with a one-to-one voltage correspondence. Assuming that the ADC 235 is in the form of an integrated circuit (IC), the first comparators 405 and the second comparator 425 should be realized with the same basic circuitry and located in the same region of the IC to provide good thermal matching. In other words, the first comparators 405 and the second comparator 425 in this exemplary embodiment are manufactured on or within the same integrated circuit in order to improve thermal matching.

The output of the second optional latch 430 is fed into a filter 435 that is part of the signal integrity unit 220. The output of the second optional latch 430 is called Event Detection (ED). After low-pass filtering by the LPF 435, the DC component remains and is termed the event monitor voltage $v_{em}$ and is an analog probability estimate for the controlled reference voltage $v_{rv}$ exceeding the received signal $v_{in}$ where $v_{rv}$ is generated by the digital-to-analog converters 415. Further details of the analog probability estimate $v_{em}$ and the controlled reference voltage $v_{rv}$ will be discussed below.

The output of the second optional latch 430 can be fed to a second analog-to-digital converter 440 that is part of the signal integrity unit 220. Opposite to first ADC 235, the second ADC 440 may be characterized as a low-speed high-resolution ADC that measures the averaged event-detector output representing the CDF value. Specifically, the reference voltage $v_{rv}$ is swept over a range of voltage levels while the second ADC 440 samples the voltage $v_{em}$ from the filter 435 to produce an estimate of the CDF.

More specifically, pseudo-code to construct the CDF could comprise one or more of the following steps: Step 1: Set the reference voltage $v_{rv}$ to the minimum value of interest, i.e. lowest possible received voltage. This could be referred to as the start of the sweep. Step 2: Measure the averaged event-detector output voltage $v_{em}$ and take that value as the CDF value for the set reference voltage. Step 3: Increment the reference voltage. Step 4: If the reference voltage is above the maximum value of interest, a "sweep" has been completed and then the reference voltage is reset and the process returns to Step 1. Otherwise, the process of "sweeping" continues and returns to Step 2. It is noted that a single point of the CDF (step 2) is obtained for each value of the reference voltage.

Therefore, the SIU 220 sets $v_{rv}$ to a fixed value and then measures the averaged ED output. The SIU 220 then sets $v_{rv}$ to a different fixed value and measures another point of the CDF. This process is completed until the CDF curve is formed.

The second ADC 440 feeds its output to a microcontroller 445. Microcontroller 445 processes the cumulative distribution function (CDF) to determine threshold voltage values for the first comparators 405. Further details of the microcontroller's processing of the CDF will be discussed below with respect to FIGS. 6A, 6B, and 9. The microcontroller 445 is responsible for feeding the threshold voltage values to the first comparators 405 for decoding the multilevel signal.

FIG. 4 illustrates a portion of a 16 level receiver 150, but it should be obvious to one skilled in the art that this circuit can be readily extended to any number of levels. For 16-levels (N=16) there is necessarily 15 (or N−1) voltage decision levels.

Through the use of the second optional latch 430 in FIG. 4, the portion of the signal analyzed can be restricted to the eye-opening sampled once each clock period. In this case, the resulting estimated cumulative distribution function (CDF) reports the distribution of received analog signal values at the sampling point used in the decision circuitry in the receiver 150, i.e. the signal timing used by the first comparators 405 is the same as that used by the EDC. This synchronization prevents other regions of the signal from corrupting the estimation process.

Although the data rate of the received signal can be very high (e.g. on the order of tens of gigabits per second), receiver 150 of the present invention does need not sample the signal at this high rate to analyze the signal. The receiver 150 avoids this impediment by using the simple high-speed second comparator 425 that indicates whether a controlled reference voltage exceeds the received signal at the clocked sample time. The resulting binary signal can then be averaged in time with the analog low-pass filter 435 to estimate the probability that the reference voltage exceeds the received signal. This probability estimate is a slowly-varying (ideally a constant) function and can thus be sampled with a high-resolution low-speed ADC 440.

Figure 5A:
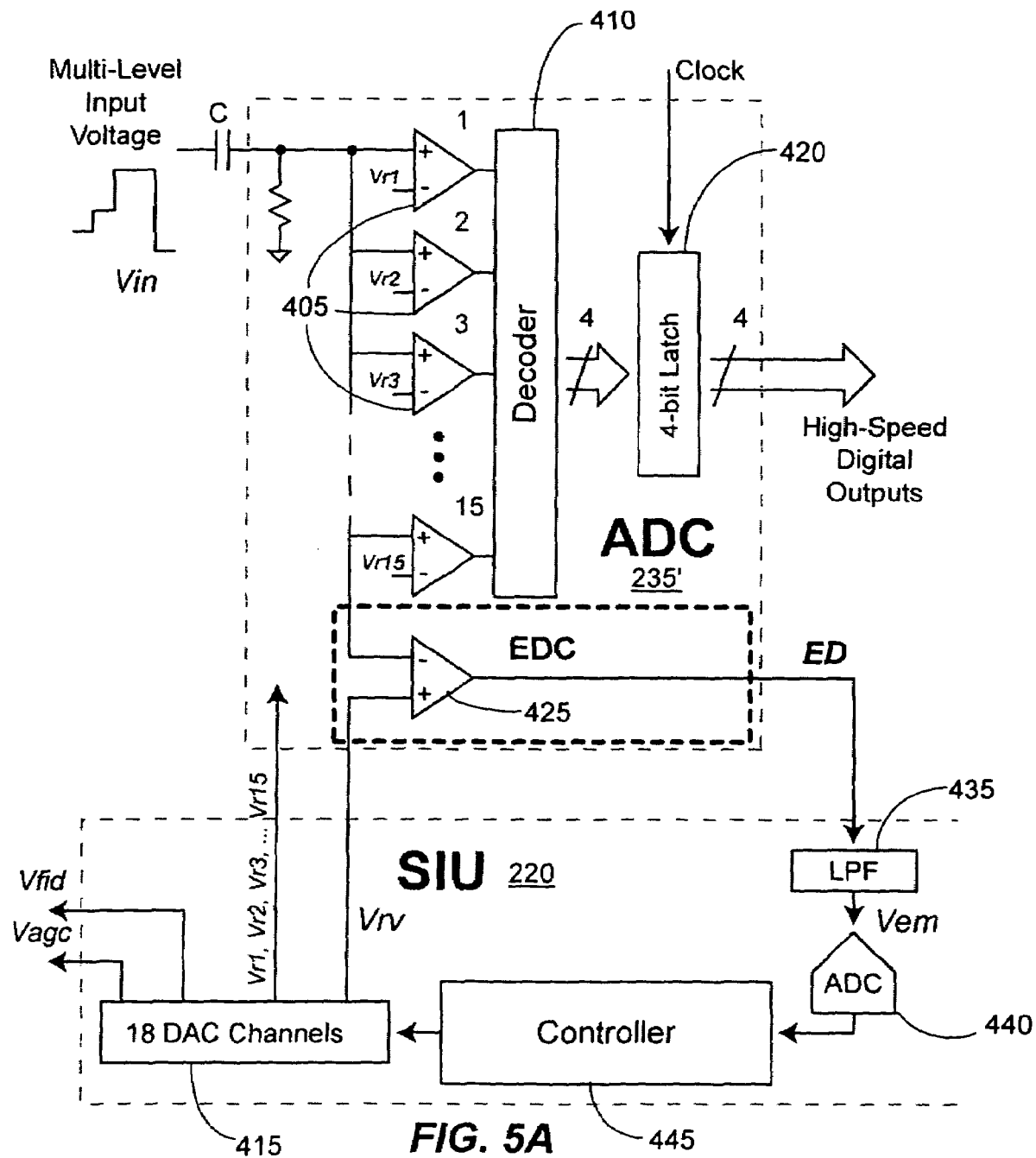
FIG. 5A illustrates a block diagram of another exemplary embodiment for a 16-level multilevel optical receiver.

Referring now to FIG. 5A, this figure illustrates another exemplary embodiment for an analog-to-digital converter (ADC) 235' and SIU 220. Only the differences between FIG. 4 and FIG. 5A will be discussed below. According to this exemplary embodiment, the second optional latch 430 that can be coupled to the low-pass filter 435 has been removed. The removal of this latch can change the region of the signal that is being analyzed. Specifically, referring back to FIG. 4, latching the output of the second comparator 425 focuses the CDF characterization to the portion of the signal synchronized with the system clock and decision output. By removing the latch as illustrated in FIG. 5A, the statistical characterization applies to the entire received signal and not just that portion which is used for the decision output.

Figure 5B:
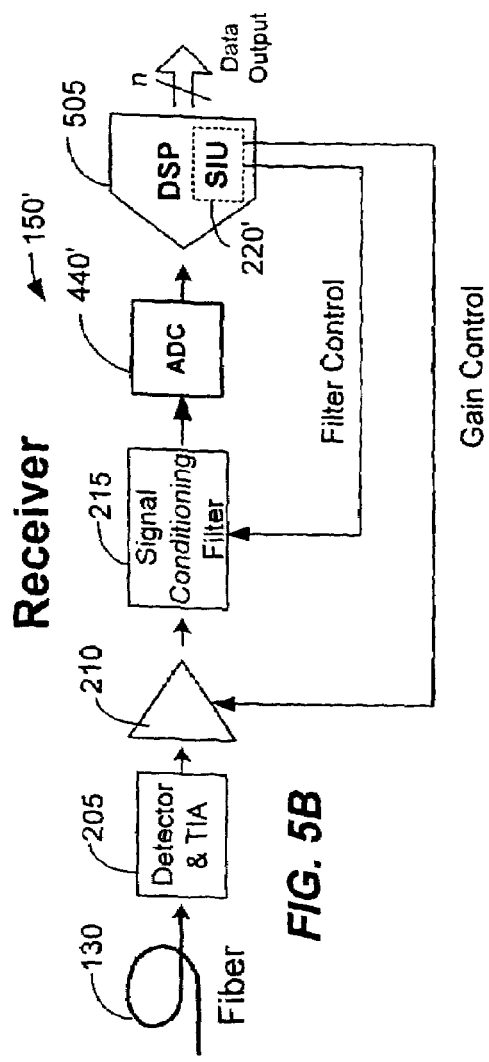
FIG. 5B illustrates a block diagram of yet another exemplary embodiment for a 16-level multilevel optical receiver.

Referring now to FIG. 5B, this figure illustrates another alternative and exemplary embodiment for a multilevel receiver according to the present invention. In this exemplary embodiment, a high-resolution analog-to-digital converter (ADC) 440' can measure the voltage of the received multilevel signal. The digitized multilevel signal can then be provided to a digital signal processor (DSP) 505. The DSP 505 can generate a CDF of the data in software using the digitized samples. Furthermore, the DSP 505 can incorporate the operation of the controller 445 in the SIU 220 to determine the decision thresholds. Then, instead of using the first comparators 405, decoder 410, and latch 420, the DSP 505 can perform the equivalent operations in software to identify each symbol of the multilevel signal.

Figure 5C:
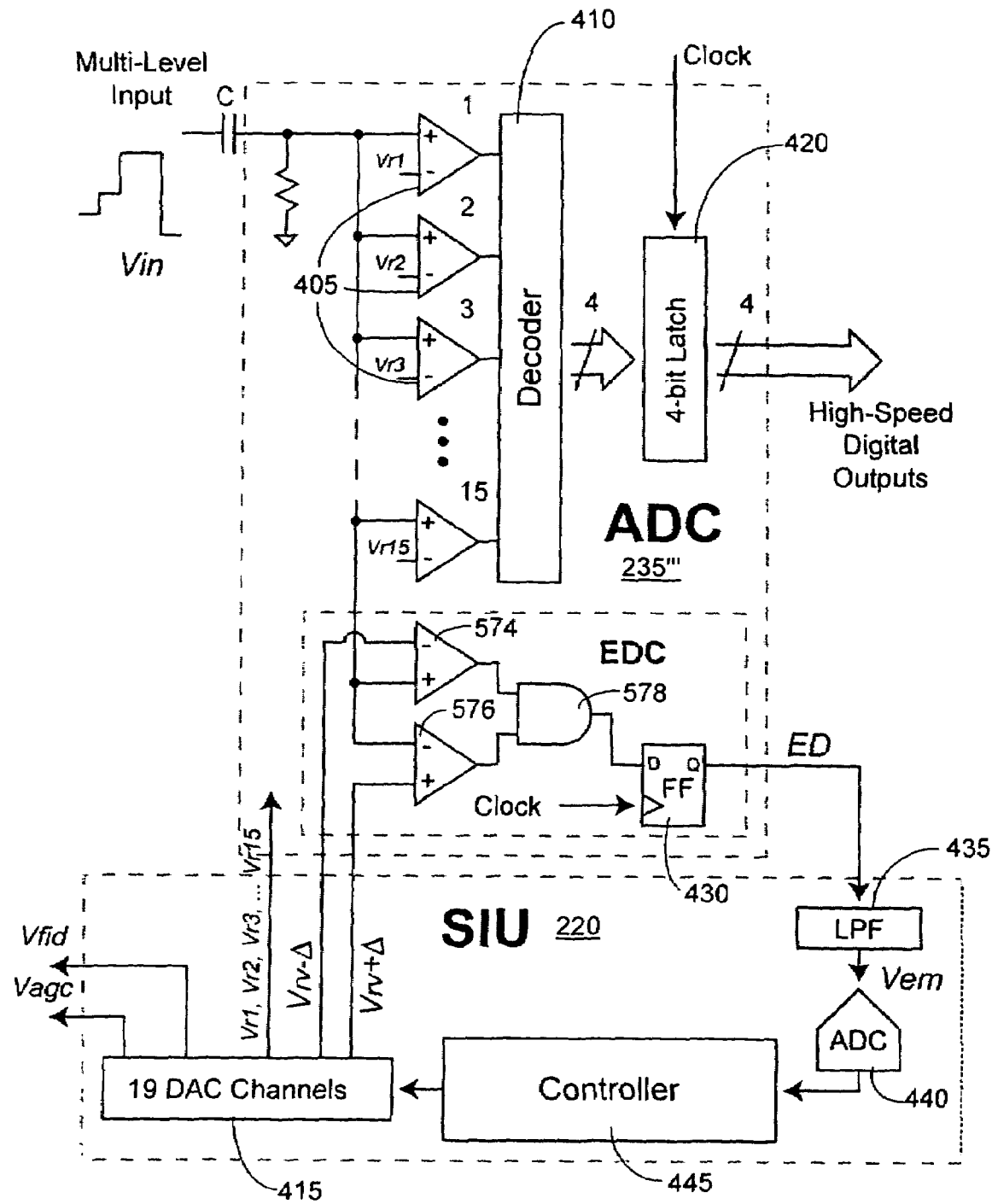
FIG. 5C illustrates a block diagram of yet a further exemplary embodiment for a 16-level multilevel optical receiver.

Referring now to FIG. 5C, this figure illustrates another alternative and exemplary embodiment for a multilevel receiver according to the present invention. Only the differences between FIG. 5C and FIG. 4 will be discussed. FIG. 5C differs from FIG. 4 in the contents of the EDC. For the embodiment of FIG. 5C, the event that the EDC detects corresponds to the received signal being between $v_{rv}-\Delta$ and $v_{rv}+\Delta$. Thus, for small values of $\Delta$, the average of the EDC output corresponds to a pdf estimate. The embodiment in FIG. 5C consequently bypasses the estimation of the CDF and directly estimates the pdf in the analog circuitry. The EDC in this exemplary embodiment comprises a pair of second comparators 574, 576 coupled to an AND gate 578. The EDC further comprises a second latch 430. As in FIG. 5A, the optional latch may be removed from FIG. 5C to pose another alternative embodiment (not shown or described herein).

Figure 6A:
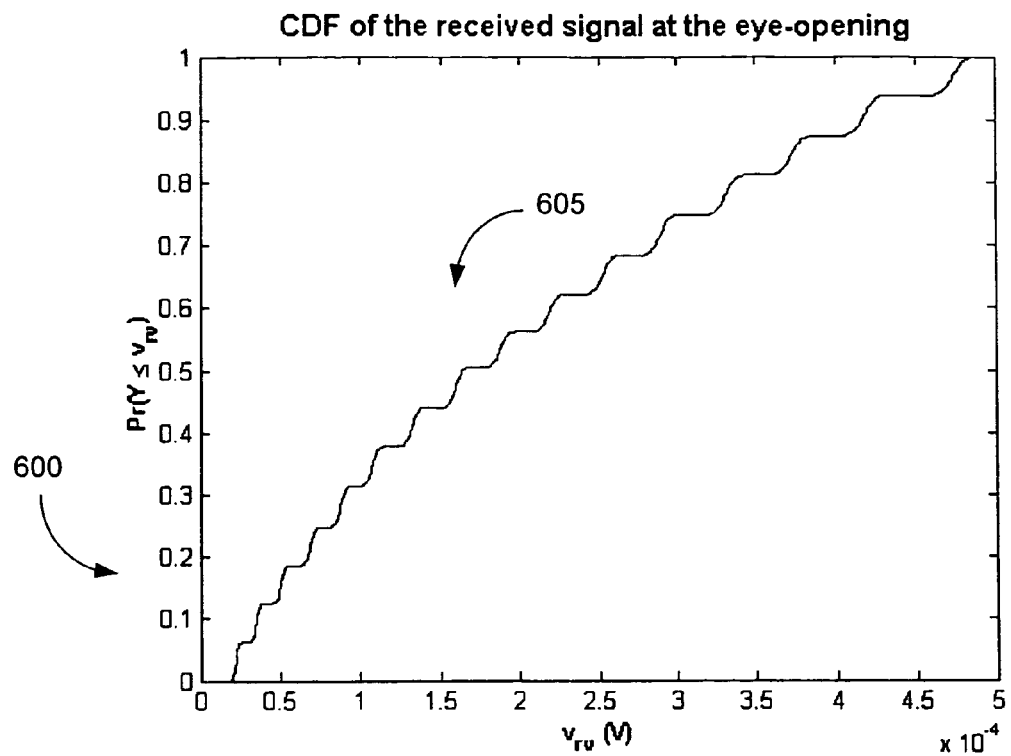
FIG. 6A illustrates an exemplary cumulative distribution function (CDF) for the received signal of FIG. 3C sampled at the horizontal eye-center.

Exemplary Cumulative Distribution Function of Simulated Received Multilevel Signal Referring now to FIG. 6A, this figure illustrates a graph 600 of an empirical cumulative distribution function (CDF) 605 for the received multilevel signal sampled at the eye openings 370 of FIG. 3C. The CDF 605 is generated by taking the received signal $v_{in}(t)$ and comparing it (with second comparator 425) to a controlled reference voltage $v_{rv}$ to produce a binary signal that indicates whether the sampled signal is less than the set reference voltage. This binary signal may then be latched (through second optional latch 430) so that only eye-opening statistics are considered. The binary signal is then low-pass filtered (with filter 435) which corresponds to averaging in time. Thus, the low-pass filtered signal conveys the fraction of time (i.e. probability) that the received signal is less than the reference voltage.

Generating this probability estimate over a range of reference voltages produces CDF 605 that can completely characterize the received signal. In particular, the estimated noise distribution (and hence threshold selection method) is free from restrictive assumptions such as Gaussianity and symmetry that, while commonly used, can be detrimental in some circumstances when dealing with multilevel data. But it is noted that the present invention can also function when Gaussian and symmetry conditions hold.

Exemplary Probability Density Function (pdf) Derived from the CDF

Figure 6B:
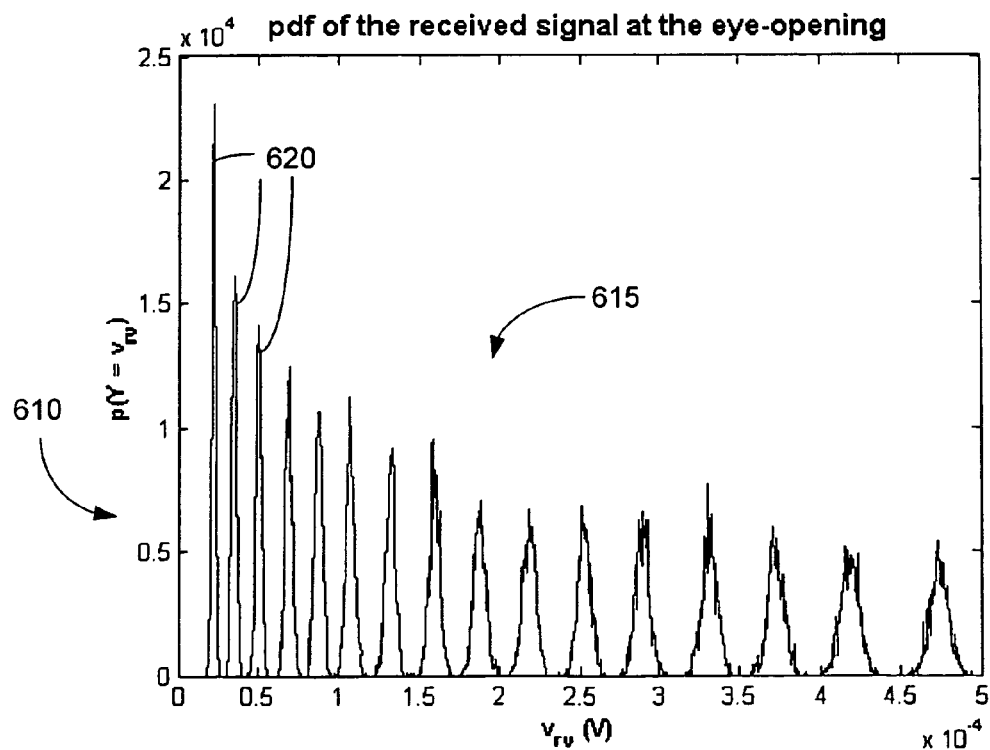
FIG. 6B illustrates an exemplary marginal probability density function (pdf) for the received signal of FIG. 3C sampled at the horizontal eye-center.

Referring now to FIG. 6B, this figure illustrates a graph 610 of a probability density function (pdf) 615 that can be derived from the CDF 605 of FIG. 6A. The microcontroller 445 of the signal integrity unit 220 can calculate this marginal pdf 615 as will be discussed below with respect to the method illustrated in FIGS. 9-14. As is evident from pdf 615, the noise incurred in transmission is signal dependent, e.g. the modes 620 of the pdf become shorter and wider as signal intensity increases. For such situations involving signal dependent noise, optimal transmission levels can be adapted to the noise in the channel to minimize the probability of error. This adaptation can be made by the transmitter 110.

Referring now to both FIGS. 6A and 6B, the minimum number of required sample points of the pdf is 2N−1 where N is the number of symbols that can be transmitted. Specifically, at least 2N−1 reference voltages would be required to describe the N peaks in the pdf (one peak for each of the candidate symbols) and the N−1 troughs (one for each pair of adjacent symbols). However, sufficiency of this minimal number of reference voltages generally requires that (i) the true underlying pdf be composed of symmetric and signal independent noise distributions, (ii) the transmission levels be uniformly spaced, and (iii) the estimation process be noise-free. None of these conditions are likely to be satisfied in practice, but their importance is vastly diminished as the number of reference voltages used is increased. In current practice, ADC technology is readily available to allow for high fidelity quantization (in excess of 14 bits or equivalently 4096 reference levels) for the sampling speeds required for the present invention.

Figure 7:
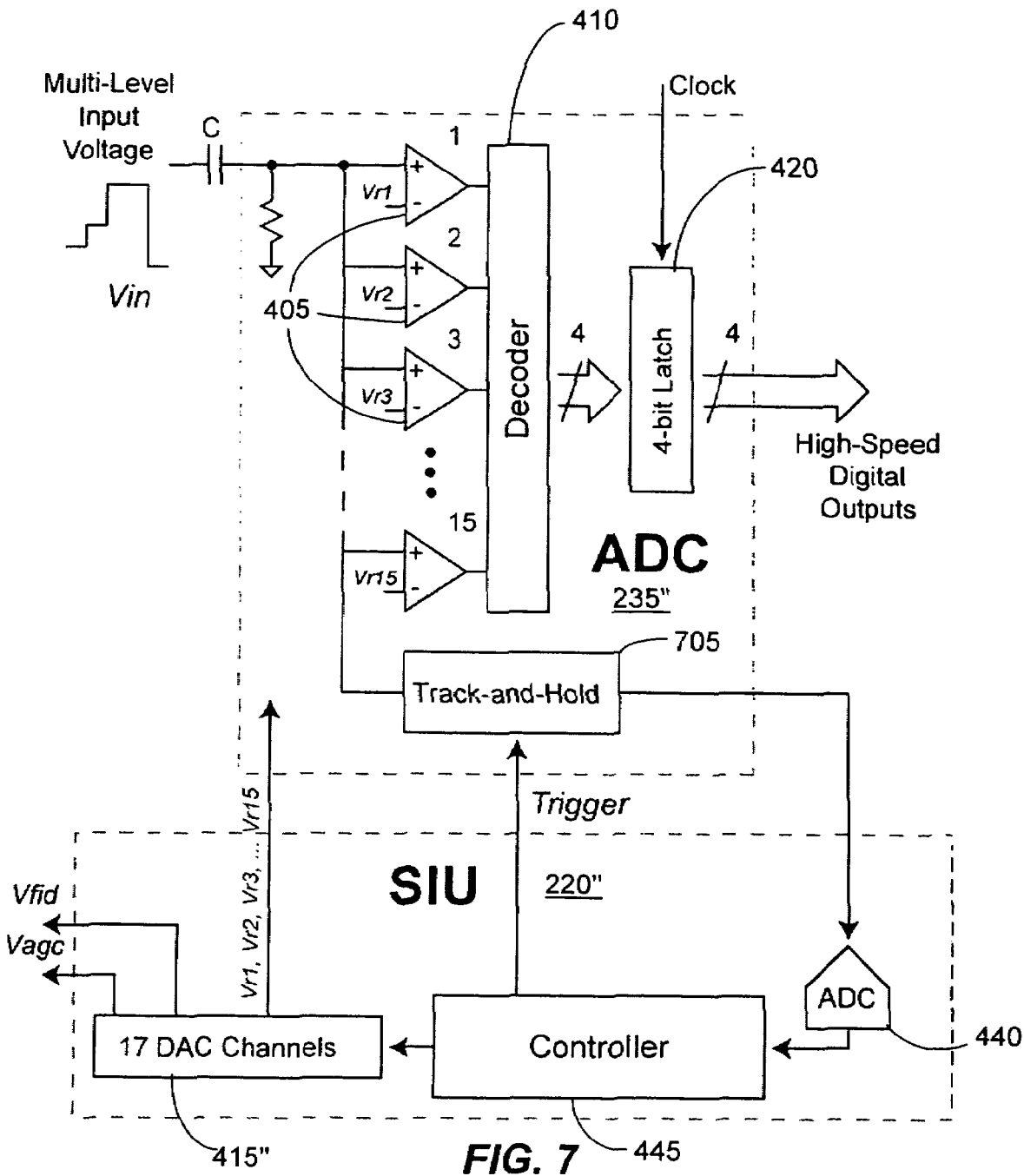
FIG. 7 illustrates a block diagram of alternative exemplary embodiment for a 16-level multilevel optical receiver.

Alternate Exemplary Embodiment for ADC and SIU of FIG. 7

Referring now to FIG. 7, another alternate exemplary embodiment for the ADC 235" and SIU 220" is illustrated. Only the differences between FIG. 4 and FIG. 7 will be discussed below. In this embodiment, the second comparator 425, latch 430, and low-pass filter 435 have been replaced with a holding circuit 705.

In this exemplary embodiment, the CDF 605 and pdf 615 can be measured in a digital fashion (rather than the analog fashion described above) by using a holding circuit 705. The holding circuit 705 can comprise a track-and-hold circuit or a sample-and-hold circuit. The track-and-hold circuit or the sample-and-hold circuit of holding circuit 705 can sample an input multilevel data signal and accumulate the samples over time. These samples can then be digitally processed to provide either a marginal pdf 605 or CDF 615. As before, the CDF 605 or marginal pdf 615 may then be used by the microcontroller 445 to determine the optimal decision threshold voltages for the comparators 405.

Additional Eye Diagram and Corresponding Digitally Processed Histogram

Figure 8A:
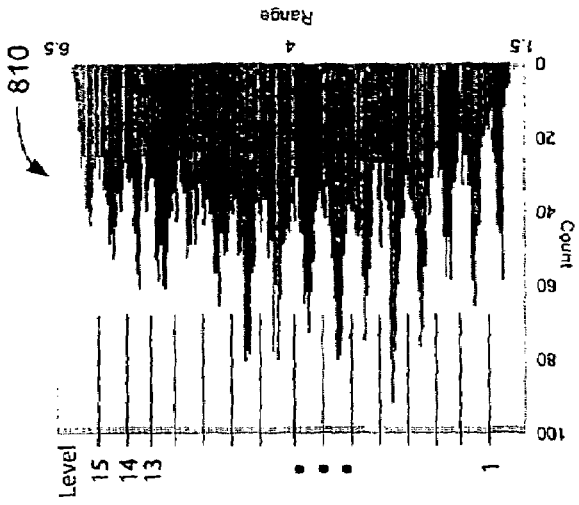
FIG. 8A illustrates another exemplary eye diagram for simulated data of a 16-level transmission.
Figure 8B:
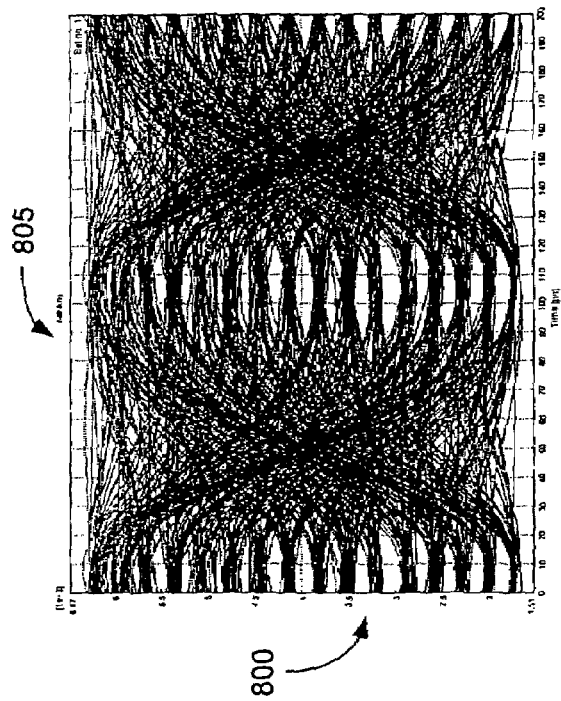
FIG. 8B illustrates a histogram of the data shown in FIG. 8A.

Referring now to FIGS. 8A and 8B, FIG. 8A illustrates a graph 800 of time versus voltage depicting an exemplary "Eye"-diagram 805 for all 4,096 received symbols corresponding to a transmitted signal that could be similar to the transmitted signal 305 of FIG. 3A. Eye diagram 805 comprises the complete data set with all symbol periods overlaid on one another. Meanwhile, FIG. 8B illustrates a histogram 810 of measured voltages for the received analog multilevel signal that is sampled at random points in time. This histogram 810 is an example of a pdf estimate. This histogram 810 is comprised of a finite number of the most recent "n" samples taken by the holding circuit 705. As a new sample is determined, the oldest is removed from the sample set.

Ideally samples would occur at times centered temporally in the high-speed data stream's eyes. This would require critical timing requirements and therefore not be expected to be cost effective. Instead, the voltage samples can be easily made at random times thereby allowing for the elimination of all critical timing circuitry. The result of random signal voltage sample times is similar to the ideal sampling case due to the smaller probability of sampling during a signal transition. While not dominant, samples do occur during a signal transition which results in a data "floor" in the histogram, which can be removed during subsequent signal processing.

Random sampling for this application means random to the high-speed data rate. This can be achieved by using a periodic sample rate, which is not harmonically related to the high-speed data rate. The actual average sample rate of the random voltage samples is dictated by the threshold update speed desired. If the communication channel is expected to vary quickly with time, the sample rate must be correspondingly high. As an example, assuming that the channel varies with a 10 ms characteristic time and 1000 samples forms the histogram; average conversion speed only need be 100,000 samples per second.

To produce the histogram 810 of FIG. 8B, the microcontroller 445 can sample the received analog voltage of the multilevel signal by triggering the holding circuit 705 at some time random in relation to the received data stream. The holding circuit 705 will necessarily have a capture bandwidth commensurate with the high-speed data stream, but will only need to be able to sample at rate much lower than that of the high-speed data stream. The microcontroller 445 would then trigger the second ADC 440 conversion and record the resulting voltage. The microcontroller 445 can continue this process until adequate statistic information can be gathered to determine the appropriate decision levels.

Method For Decoding a Multilevel Signal

Figure 9:
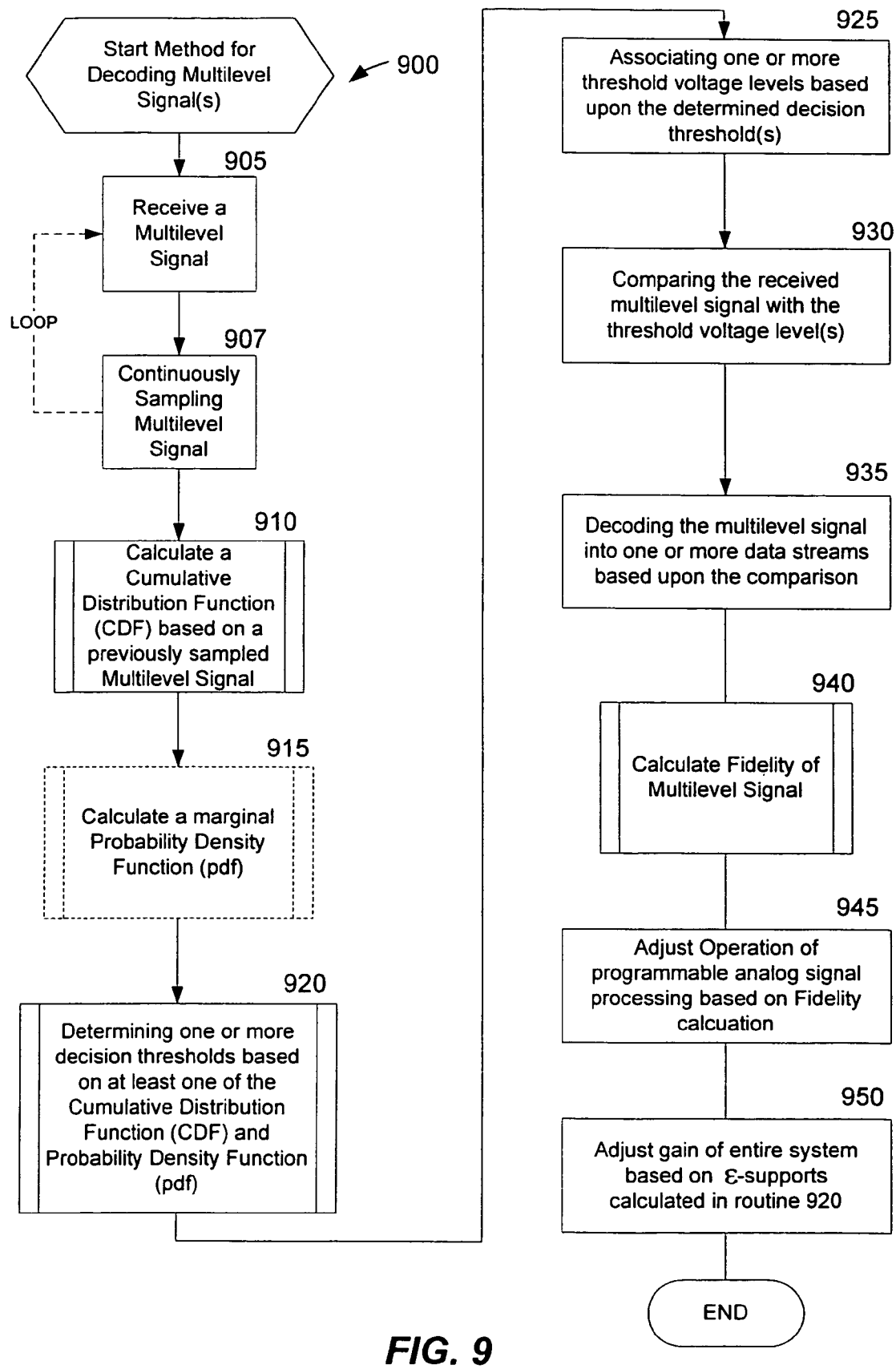
FIG. 9 is an exemplary logic flow diagram illustrating a method for decoding a multilevel signal.

Referring now to FIG. 9, this figure is an exemplary logic flow diagram that illustrates a method 900 for decoding a multilevel signal according to the embodiment illustrated by FIGS. 2 and 4. Differences in implementation and operation compared to other embodiments are described after the full operation of the embodiment in FIGS. 2 and 4 is discussed. Certain steps in the processes described below must naturally precede others for the present invention to function as described. However, the present invention is not limited to the order of the steps described if such order or sequence does not alter the functionality of the present invention. That is, it is recognized that some steps may be performed before, after, or in parallel with other steps without departing from the scope and spirit of the present invention.

The method 900 starts with step 905 in which a multilevel signal is received by the first comparator 405 of a multilevel receiver 150. In step 907, the received multilevel signal is continuously sampled. Step 907 basically describes an approach where the multilevel signal is continuously observed in order to decode the received data. In other words, step 907 may describe a loop where the multilevel signal is continuously sampled while the remaining steps of FIG. 9 are performed in parallel relative to the continuous sampling carried out in step 907.

Next in routine 910, a cumulative distribution function (CDF) based upon previous symbols in the multilevel signal is calculated by the microcontroller 445 of the signal integrity unit 220. Further details of routine 910 will be discussed below with respect to FIG. 10.

Next, in optional routine 915, a marginal probability density function (pdf) is calculated by the microcontroller 445 based upon the CDF calculated in routine 910. As noted above, a marginal pdf can be defined as an "overall" pdf that results from random symbols being received. A marginal pdf can comprise one or more conditional pdfs. A conditional pdf is a pdf associated or corresponding to an individual symbol of a multilevel signal. Routine 915 is optional since decision thresholds can be calculated from the CDF alone. Further details of routine 915 will be discussed below with respect to FIGS. 11 and 12.

In routine 920, one or more decision thresholds based on at least one of the CDF and pdf can be determined. As mentioned previously, since the calculation of the pdf is optional, decision thresholds can be determined from a calculated CDF alone. The microcontroller 445 is usually responsible for performing routine 920. Further details of routine 920 will be discussed below with respect to FIG. 13.

In step 925, the microcontroller 445 associates a threshold voltage level with each determined decision threshold calculated in routine 920. The microcontroller 445 forwards these voltage levels to the one or more first comparators 405 of the first analog-to-digital converter (ADC) 235.

Next, in step 930, each first comparator 405 compares the received multilevel signal with the one or more threshold voltages supplied by the microcontroller 445. In step 935, the decoder 410 of the first ADC 235 decodes the multilevel signal into one or more data streams based upon the comparisons.

In routine 940, the microcontroller estimates the fidelity of the received multilevel signal. Further details of routine 940 will be discussed below with respect to FIG. 14.

In step 945, the operation of the programmable analog signal processors located in the signal conditioning filter 215 can be adjusted by the microcontroller 445 of the signal integrity unit 220 based upon the calculated fidelity in routine 940. For example, the weighting coefficients of a programmable delay line equalization filter could be adjusted to minimize the estimated probability of error inferred from this fidelity measure. Similarly, a controllable delay on the clock timing may be adjusted to maximize the fidelity measure.

Next in step 950, the gain of the entire system can be adjusted based on the range of received signal values inferred from the pdf as is discussed later.

Exemplary Embodiment of Sub-Method for Calculating Cumulative Distribution Function (CDF)

Referring now to FIG. 10, this figure illustrates exemplary steps for routine 910 of FIG. 9 that calculates a CDF according to the exemplary embodiment of the invention illustrated in FIG. 4. Routine 910 starts with step 1005 in which a reference voltage is swept over a range of feasible voltage levels by the microcontroller 445 of FIG. 4. During step 1005, the second comparator 425 and low-pass filter 435 generate an analog probability estimate $v_{em}$ for a controlled reference voltage $v_{rv}$. In other words, while sweeping $v_{rv}$, $v_{em}$ is measured. The measurement estimates the probability that the reference voltage exceeds the received signal.

To understand why this occurs, consider the reference $v_{rv}$ held at a constant voltage. The output of the second comparator 425 is a binary value equal to one if $v_{in} \leq v_{rv}$ and equal to 0 otherwise. This output can thus be written as the indicator function $1\,(v_{in} \leq v_{rv})$. The low-pass filter 435 (labeled LPF) then averages this function over time, i.e. it approximates the fraction of the time that $v_{in}$ is less than $v_{rv}$, or in other words, it approximates the probability $P(v_{in} \leq v_{rv})$. More precisely, $$v_{em} = v_{ol} + K \cdot Avg\,[1(v_{in} \leq v_{rv})] \quad (1)$$

$$\approx v_{ol} + K \cdot \int_{-\infty}^{\infty} 1(v_{in} \leq v_{rv}) p(v_{in}) dv_{in}$$

$$= v_{ol} \int_{-\infty}^{v_{rv}} p(v_{in}) dv_{in}$$

$$= v_{ol} + K \cdot P(v_{in} \leq v_{rv})$$

in which $v_{ol}$ is the output voltage low state of the D-FF and K is a proportionality constant identical to the voltage swing from the D-FF ($K = v_{oh} - v_{ol}$ where $v_{oh}$ is the output voltage high).

Next in step 1010, the microcontroller 445 measures the resulting probability estimate in order to generate the CDF 605 illustrated in FIG. 6A (which can be converted to a more intuitive pdf as discussed with respect to FIG. 12 below). The sub-method then returns to routine 915 of FIG. 9.

Exemplary Embodiment of Sub-Method for Calculating a Probability Density Function Referring now to FIG. 12, this figure illustrates exemplary steps for routine 915 of FIG. 9 that calculates a pdf according to the exemplary embodiment of FIG. 4. Routine 915 starts with step 1205 in which a first difference is calculated for the CDF 605 determined in routine 910. The first difference is generally the discrete time equivalent of a derivative. Specifically, for a sequence x[n], the first difference is the sequence x[n]-x[n-1]. The result is the histogram $h(v_{rv})$ (not shown).

Unless a very large number of samples are used for each of the CDF points, there will be a considerable amount of statistical noise in the resulting pdf. Thus, step 1215 smoothes the histogram $h(v_{rv})$ (not shown) by filtering the histogram along the reference voltage. Specifically, $h(v_{rv})$ is convolved with a boxcar function to filter the histogram along $v_{rv}$ to produce the smoothed pdf $g(v_{rv})$. This operation is motivated by regularity assumptions on the underlying noise distribution. Furthermore, the application of the differentiation (step 1205) and convolution to the CDF can be combined into one step, i.e.

$$g\left(\frac{v_k + v_{k+1}}{2}\right) = \frac{1}{(2R+1)\Delta_v}[P(v_{k+R+1}) - P(v_{k-R})] \quad (2)$$

where $P(v_k)$ represents the CDF measured at voltage $v_k$, R is the "radius" of the boxcar kernel, and $\Delta_v$ is the spacing between voltage samples. Note that the calculation in Eq. (2) is no more computationally intensive than taking a first difference (step 1205).

In step 1220, the histogram $g(v_{rv})$ (not shown) can be smoothed along the time domain. Specifically, the histogram is smoothed along the time domain because should the pdfs vary slowly with time (if at all), by smoothing in time, more samples are being used (in an iterative framework) to estimate the probabilities without having to acquire many samples to generate each probability estimate. In essence, measurements of $v_{em}$ are being recycled to estimate the pdf. To be more precise, first consider the pdf evaluated for a particular voltage v, i.e. consider the pdf on a pointwise basis. For each iteration n, a pdf value $g_n(v)$ (i.e. the pdf smoothed along voltage) is measured providing a noisy measurement of the true pdf value $p_n(v)$ at time n, i.e. the observation model is $$g_n(v) = p_n(v) + w_n(v) \quad (3)$$

where $w_n(v)$ is sample noise which is assumed to be white, i.e. the inner product of $w_n(v)$ with $w_m(v)$ is a Dirac function. The evolution of the true pdf is modeled by the independent increments (and thus Markov) process $$p_n(v) = p_{n-1}(v) + u_n(v) \quad (4)$$

where $u_n(V)$ is another white noise process independent of $w_n(v)$. The optimal estimator for the system given by the state dynamics in Eqs. (3) and (4) is the recursive estimator $$q_n(v) = \alpha[g_n(v) \cdot q_{n-1}(v)] + q_{n-1}(v) \quad (5a)$$
$$= (1-\alpha)q_{n-1}(v) + \alpha g_n(v) \quad (5b)$$

where $q_n(v)$ denotes the pdf estimate at iteration n. Eq. (5a) is written in the form of a trivial Kalman filter (with Kalman gain $\alpha$). Eq. (5b) is the Kalman filter rewritten in a form which makes the exponential memory decay of the process more explicit.

The reader may wonder why using Eq. (5) is preferable to simply using more samples to generate each $g_n(v)$. Although both approaches can be used to provide an estimate with high statistical significance, the brute force method of simply using more samples requires an associated larger amount of time to acquire those samples. The state-space approach in Eq. (2.4) recycles information so that the time required to generate each $g_n(v)$ can be considerably reduced. Eqs. (2) and (5) provide a smoothed (in both voltage and time) pdf 615 from the CDF provided through $v_{em}$. The smoothing (in either voltage or time) steps 1215 and 1220 are optional and may not be required if adequate statistical significance can be achieved in a reasonable amount of time. After generating and optionally smoothing the pdf 615, the process then returns to routine 920 of FIG. 9.

Exemplary Embodiment of Sub-Method for Calculating Decision Thresholds

Figures 13, 14:
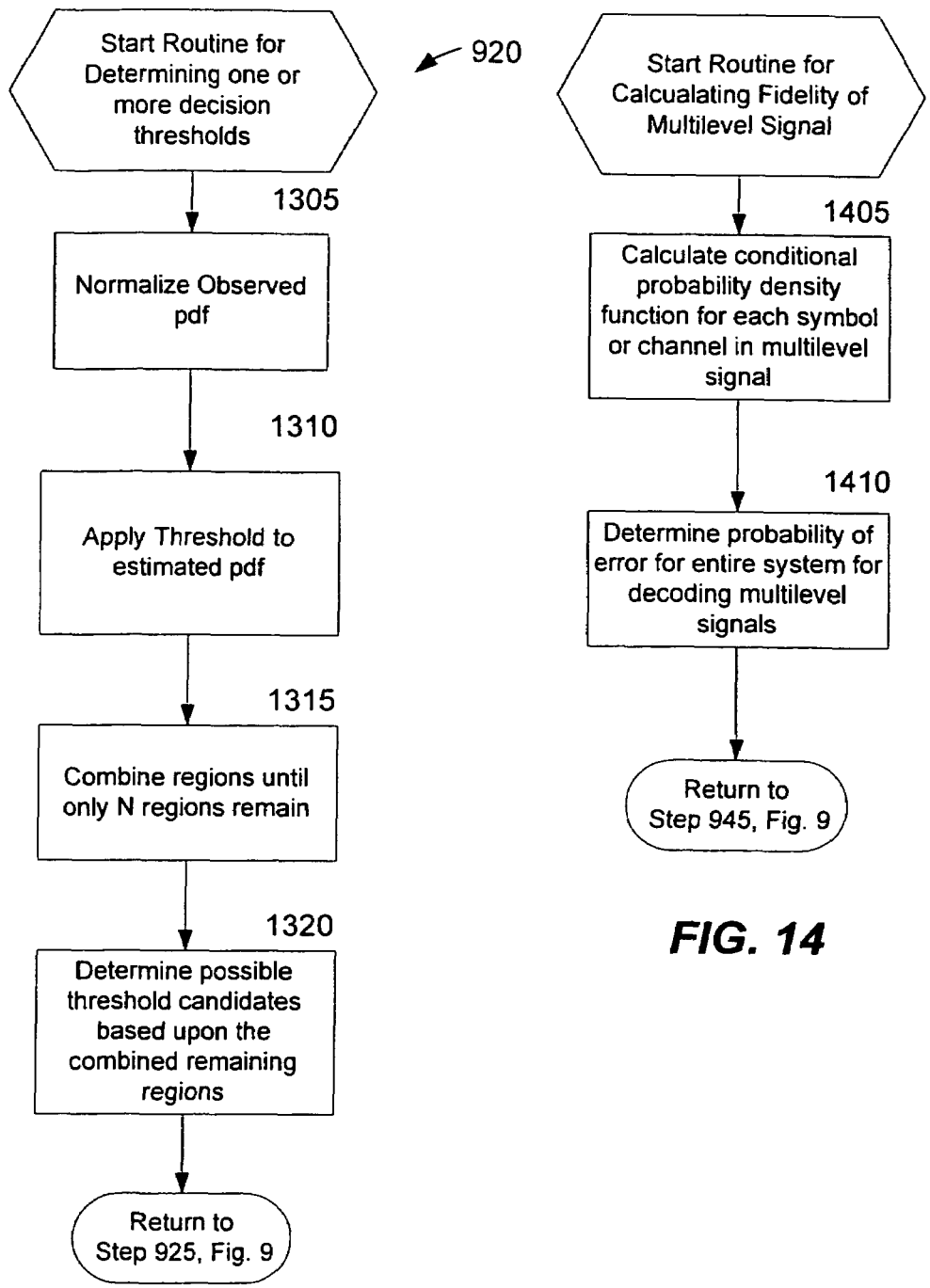
FIG. 13 is an exemplary logic flow diagram illustrating a sub-method of FIG. 9 for calculating one or more decision thresholds according to an exemplary embodiment of the present invention.
FIG. 14 is an exemplary logic flow diagram illustrating a sub-method of FIG. 9 for calculating the fidelity of a multilevel signal according to an exemplary embodiment of the present invention.
Figure 15:
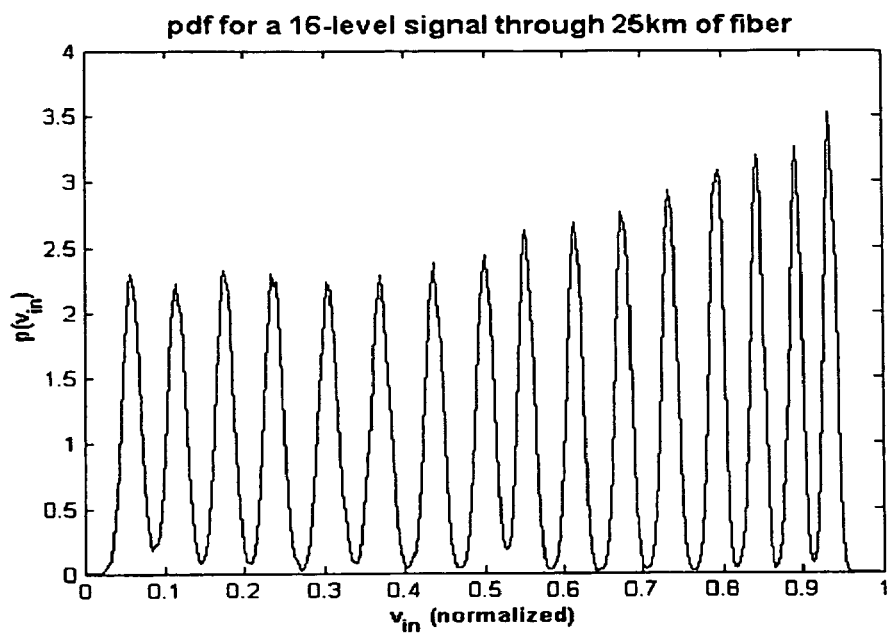
FIG. 15 illustrates a graph of an exemplary measured pdf for an N=16 level multilevel signal according to an exemplary embodiment of the present invention.

Referring now to FIG. 13, this figure illustrates exemplary steps for routine 920 of FIG. 9 that determines the one or more decision thresholds according to an exemplary embodiment of the present invention. To motivate the proposed methodology, the underlying analysis is presented here. It starts with a model of the received N-level signal. For each transmitted signal level $x=A_n$ ($n \in \{0, \ldots, N-1\}$), the received symbol y has an associated conditional pdf $p(y|x=A_n)$. This conditional pdf is the pdf for the received symbol conditioned on transmitting a particular level $A_n$. When the transmitted level is not known (as is the case in realistic settings), the pdf characterizing the received symbol is the marginal pdf $$p(y) = \frac{1}{N}\sum_{n=0}^{N-1} p(y|x=A_n) \quad (6)$$

where it is assumed that all the symbols are equally likely to have been transmitted. To illustrate the structure of such a marginal pdf, FIG. 15 illustrates the marginal pdf (as a measured histogram) for an 16-level signal transmitted through 25 km of fiber. There are N=16 clearly identifiable modes of the pdf associated with the N transmission levels. There will always be at least N such distinct modes in situations where signal detection is possible. This property will be exploited for the operation of the SIU.

The manner in which the pdf's structure is exploited will be through the use of what this detailed description refers to as "$\epsilon$-supports". The support of a function $f(x)$ is mathematically defined to be the set $\{x|f(x)>0\}$, i.e. where the function is strictly positive. This is generalized to define the $\epsilon$-support of a pdf as $$S_\epsilon = \{y|p(y) > \epsilon\} \quad (7)$$

i.e. the $\epsilon$-support conveys the range of values of y that are likely to be observed. Furthermore, if the received signal is of reasonable fidelity (i.e. if the received symbols can be correctly detected with a low probability of error), then the $\epsilon$-supports for the each of the transmitted symbols do not overlap. Thus, a unique $\epsilon$-support is identified with each conditional pdf, i.e.

$$S_{n,\epsilon} = \{y|p(y|x=A_n) > \epsilon\} \quad (8)$$

that conveys the range of values of y that are likely to be observed when transmitting level $A_n$.

In practice, the conditional pdf's are usually unknown. However, an estimate $\hat{p}(y)$ of the marginal pdf can be obtained from the low-pass filtered event-detector output. Because the modes of the pdf are well separated (as in FIG. 15), for links of reasonable quality, reliable estimates can be obtained of the conditional $\epsilon$-supports by taking them as the N regions composing the marginal $\epsilon$-support $S_\epsilon$. Specifically, the following three steps can be taken to obtain estimates of $S_{n,\epsilon}$.

1. In step 1305, the observed pdf $\hat{p}(y)$ is normalized to have a peak value of 1, i.e. define $$\hat{q}(y) = \frac{\hat{p}(y)}{\max_y\{\hat{p}(y)\}} \tag{9}$$

2. Next, in step 1310, $\hat{q}(y)$ is thresholded against $\epsilon$ (which is normalized to the range $0<\epsilon<1$), i.e. estimate $S_\epsilon$ as $$\hat{S}_\epsilon = \{y|\hat{q}(y)>\epsilon\} \tag{10}$$

where the resulting $\hat{S}_\epsilon$ is a set of intervals or "regions".

3. In step 1315, if there are more than N connected intervals composing $\hat{S}_\epsilon$, then iteratively merge the two regions that are "closest" together until only N regions remain, where the measure of "closeness" is given by the function:

$$d(A,B) = \min_{a\in A, b\in B} \left|\frac{a-b}{\lambda_A + \lambda_B}\right| \tag{11}$$

for any two regions $A,B \in \hat{S}_\epsilon$ where $\lambda_A$ and $\lambda_B$ are the lengths (i.e. Lebesgue measure) of A and B, respectively. By "merging" regions A and B, it means to take the convex hull of their union (i.e. if $A=[a_{low}, a_{high}]$, $B=[b_{low}, b_{high}]$, and $a_{high}<b_{low}$, then the merger is taken as $[a_{low}, b_{high}]$).

Note that one skilled in the art will understand that a variety of functions can be used in place of Eq. (11) and still yield the desired result. All that is required is that the chosen function conveys a notion of the distance between sets. It should also be noted that step 1315 above has the additional benefit that if the data exhibits multiple eye-lids or multiple-rails for a single transmitted symbol, then the merging will associate the multiple eye-lids according to their underlying common transmitted symbol. Specifically, link characteristics such as nonlinearities and intersymbol interference result in signal distortions that manifest themselves as multi-modal conditional pdf's (or equivalently multiple eye-lids when the data is viewed as an eye-diagram). The multiple modes result in extra, but closely spaced, regions in $\hat{S}_\epsilon$. The merging in step 1315 combines these multiple modes according to the underlying transmitted symbol.

In step 1320, possible threshold candidates are determined based upon the combined remaining regions of the $\epsilon$-supports. Specifically, having estimated N $\epsilon$-supports (each associated with one of the possible signal levels $A_n$), the following describes how the thresholds are set between the regions. First, each of the conditional pdf's $p(y|x=A_n)$ are modeled as a Gaussian (more to be said about the Gaussian modeling and application to non-Gaussian noise at the end of this subsection). In particular, for each transmitted signal level $x=A_n$ ($n \in \{0, \ldots, N-1\}$), the received symbol y is modeled with the conditional pdf $$p(y|x=A_n) = \phi(y; \mu_n, \sigma_n) \tag{12}$$

where $\phi(y; \mu_n, \sigma_n)$ is the Gaussian pdf with mean $\mu_n$ and standard deviation $\sigma_n$, i.e.

$$\varphi(y; \mu_n, \sigma_n) = \frac{1}{\sqrt{2\pi}\,\sigma_n}\exp\left[\frac{-(y-\mu_n)^2}{2\sigma_n^2}\right]. \tag{13}$$

Because each conditional pdf is assumed to be Gaussian, it is characterized by the conditional mean $\mu_n$ and standard deviation $\sigma_n$. These two parameters are unknown quantities which must be estimated from the received data. To do this, the observed marginal pdf $\hat{p}(y)$ and the $\epsilon$-supports $\hat{S}_{n,\epsilon}$ are used. Specifically, step 1320 can comprise the following substeps:

1. Compute the empirical mean and standard deviation based on $\hat{p}(y)$ but restricted to the domain where y is in $\hat{S}_{n,\epsilon}$, i.e.

$$\bar{\mu}_n = \frac{\int_{\hat{S}_{n,g}} y\hat{p}(y)dy}{\int_{\hat{S}_{n,g}} \hat{p}(y)dy} \tag{14}$$

$$\bar{\sigma} = \sqrt{\frac{\int_{\hat{S}_{n,g}} (y-\bar{\mu}_n)^2 \hat{p}(y)dy}{\int_{\hat{S}_{n,g}} \hat{p}(y)dy}} \tag{15}$$

2. The quantities $\bar{\mu}_n$ and $\bar{\sigma}_n$ correspond to the mean and standard deviation of y conditioned on the events that (i) level $A_n$ was transmitted and (ii) the received value y lies in the set $\hat{S}_{n,\epsilon}$. However, the parameters $\mu_n$ and $\sigma_n$ that are desired are the mean and standard deviation conditioned only on the event that level $A_n$ was transmitted (i.e. the range of y is not restricted). To obtain this quantity, $\bar{\mu}_n$ and $\bar{\sigma}_n$ are scaled appropriately with the set $\hat{S}_{n,\epsilon}$ to unbias the estimates. Using the appropriate normalization, this produces potential estimates of $\mu_n$ and $\rho_n$ as $$\hat{\mu}_n = \bar{\mu}_n \tag{16}$$

$$\hat{\sigma}_n^2 = \frac{\bar{\sigma}_n^2}{1 - \frac{2\varepsilon\sqrt{\ln(1/\varepsilon)}}{\sqrt{\pi}\,\mathrm{erf}(\sqrt{\ln(1/\varepsilon)})}} \tag{17}$$

where Eq. (16) implies that $\bar{\mu}_n$ is already appropriately normalized. However, the estimate given by Eq. (17) is not used as it is written for the following reason. Even though $\epsilon$ is a user-specified parameter, its use in Eq. (17) is not quite correct. Specifically, recall that the threshold $\epsilon$ is applied to the marginal pdf in contrast to the conditional pdf for level $A_n$. Because the true standard deviation $\sigma_n$ will likely vary among the different levels, the specified $\epsilon$ is correctly normalized only for the conditional pdf with the largest peak (i.e. smallest $\sigma_n$) and the use of this value of $\epsilon$ for all n, is inappropriate. To correct for this level dependent fluctuation in $\epsilon$, the value of $\epsilon$ is estimated for each level $A_n$ from the empirical probability measure of the associated $\epsilon$-support region. One skilled in the art can calculate this revised value of $\epsilon$ as $$\epsilon_n = \exp[-\mathrm{erfinv}(N\int_{\hat{S}_{n,\epsilon}}\hat{p}(y)dy)^2]. \tag{18}$$

Thus, in computing $\hat{\sigma}_n$, $\epsilon_n$ is used as defined by Eq. (18) instead of the user-specified $\epsilon$.

These steps provide $\hat{\mu}_n$ and $\hat{\sigma}_n$ for all n, and thus, a characterization of all the conditional pdf's.

Figure 16:
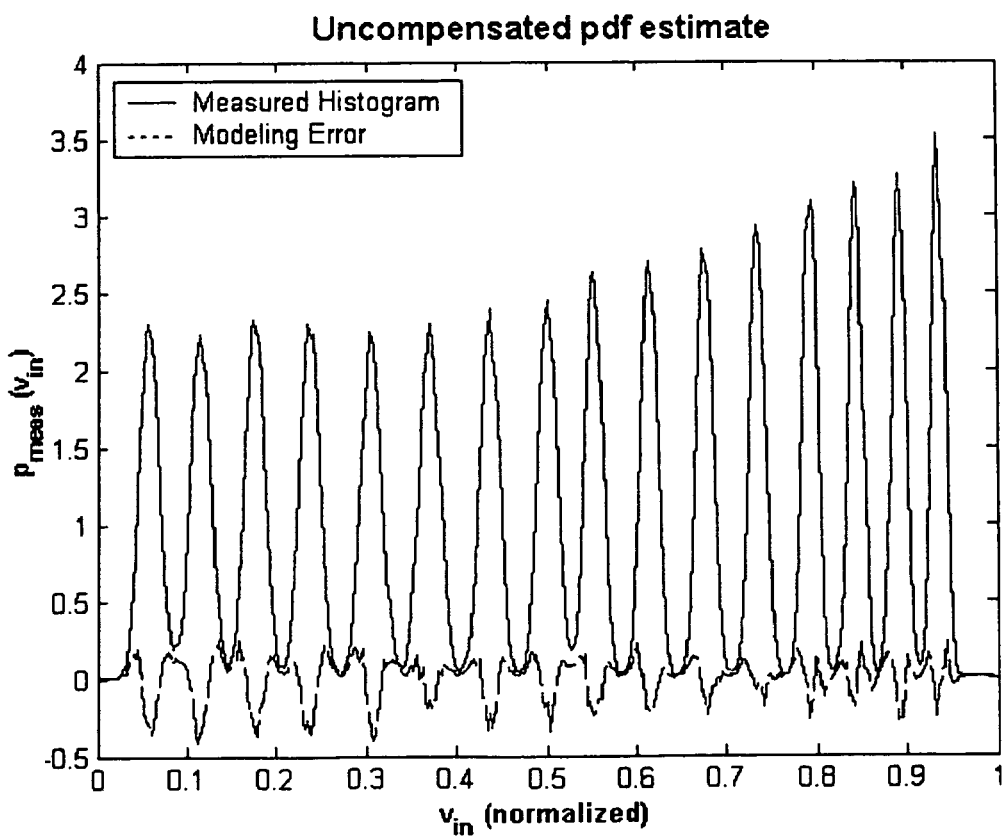
Figure 17:
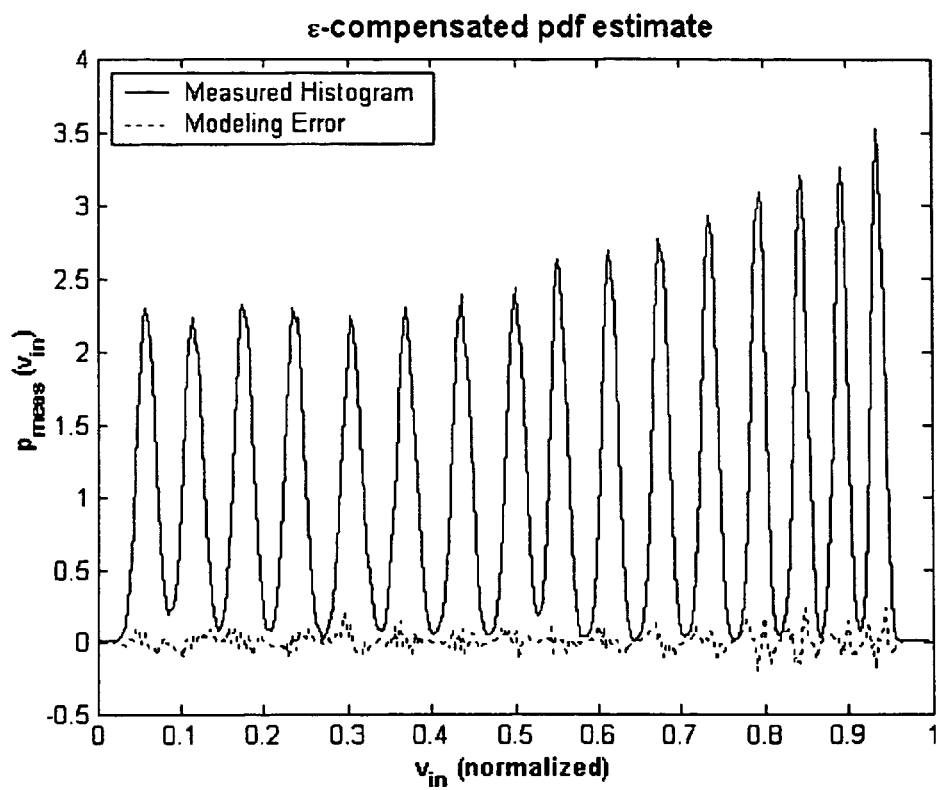
FIG. 17 illustrates a graph of an exemplary revised pdf estimate for an N=16 level multilevel signal according to an exemplary embodiment of the present invention.

FIGS. 16-17 (for a 16-level signal) show the results of this procedure on the data in FIG. 15. The measured pdf is shown in the solid curve. The difference between the measured pdf and the Gaussian mixture model (i.e. the modeling error) is shown with the dotted curve. FIG. 16 shows the modeling error for the Gaussian model when the parameter estimates are given by Eqs. (16) and (17) without the correction for $\epsilon$; FIG. 17 shows the error when the parameter estimates include the $\epsilon$correction in (18). The improvement from using $\epsilon_n$ is negligible for larger values of $v_{in}$ (since $\epsilon$ is already approximately correct), but the improvement is significant for smaller value of $v_{in}$ where there are large differences among the $\sigma_n$, and hence $\epsilon$.

Figure 18:
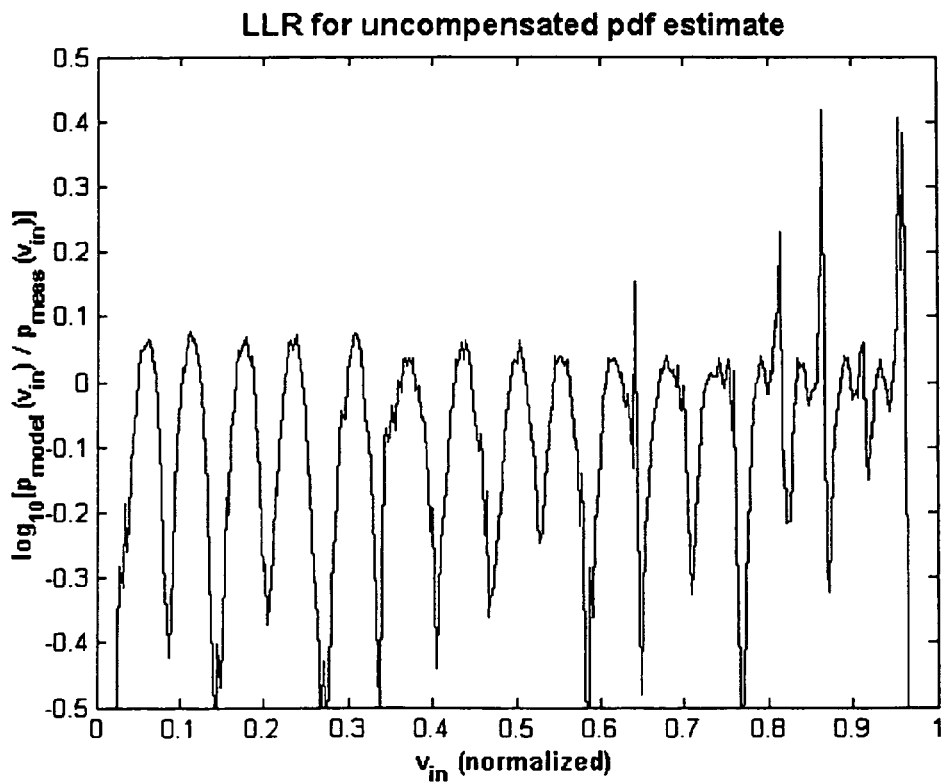
FIG. 18 illustrates a graph of the log-likelihood ratio of an exemplary initial pdf estimate over the measured pdf for an N=16 level multilevel signal according to an exemplary embodiment of the present invention.
Figure 19:
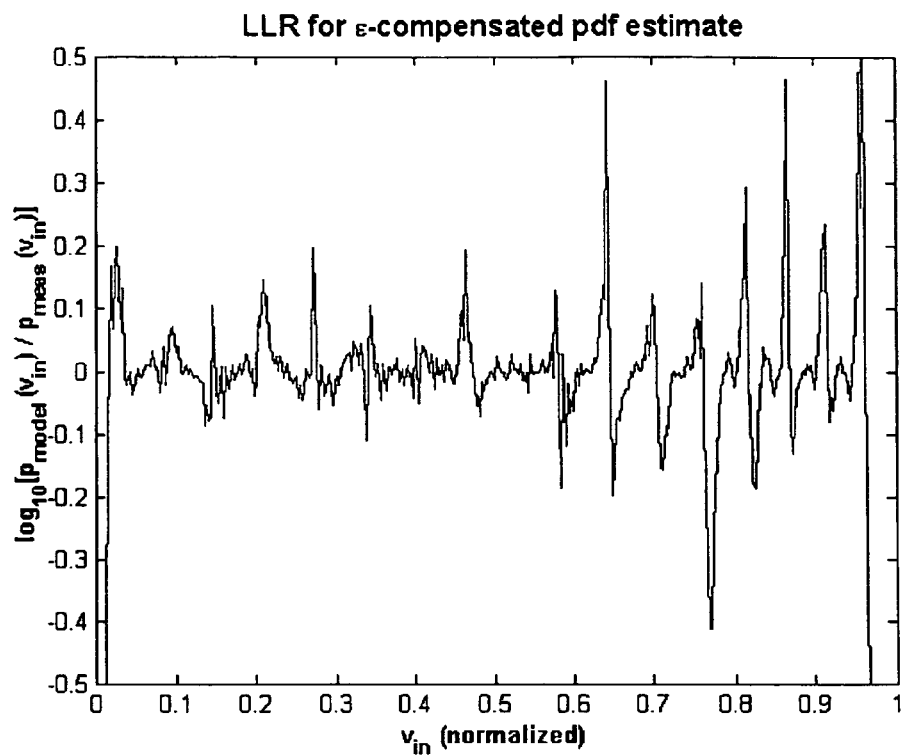
FIG. 19 illustrates a graph of the log-likelihood ratio of an exemplary revised pdf estimate over the measured pdf for an N=16 level multilevel signal according to an exemplary embodiment of the present invention.

FIGS. 18-19 show the log-likelihood ratio (LLR) of the measured pdf to the modeled pdf. The information content is the same as that in FIGS. 16 and 17, but because the LLR is used in place of the difference, the plot emphasizes the goodness of fit in the tails of the distribution. From FIGS. 18-19, it is seen that the Gaussian model does provide an accurate fit in the tails of the distribution down to the floor associated with the limited amount of data.

Referring back to FIG. 13, as an alternative approach to estimating $\mu_n$ and $\sigma_n$, instead of using an approach based on the empirical statistics in Eqs. (14) through (17), the parameters can be estimated directly from the location and length of the $\epsilon$-support $\hat{S}_{n,\epsilon}$. Specifically, denoting $\hat{S}_{n,\epsilon}$ as the closed interval [a, b], the conditional mean can be taken as $$\hat{\mu}_n = (a+b)/2 \tag{19}$$

and the conditional standard deviation as $$\hat{\sigma}_n = \frac{b-a}{2\sqrt{2\ln(1/\varepsilon)}} \tag{20}$$

As with Eq. (17), the estimate in Eq. (20) can be improved by using $\epsilon_n$ from Eq. (18) in place of $\epsilon$.

Using the Gaussian model and estimated parameters $\hat{\mu}_n$ and $\hat{\sigma}_n$ the decision thresholds can now be proposed. The nature of noise in communications channels is that the noise perturbations are usually small rather than large. Not only is this the case for the Gaussian noise model, but for many other noise models as well. For this reason, in this and the following section, we consider only symbol errors associated with an adjacent level. These types of errors dominate the link performance characterization. Thus, it is sufficient to consider each pair of adjacent transmissions in a conventional on-off keying (OOK) context. In particular, the optimal threshold to differentiate levels $A_n$ and $A_{n+1}$ is well approximated by $$T_{n,n+1} = \frac{\hat{\mu}_n \hat{\sigma}_{n+1} + \hat{\mu}_{n+1} \hat{\sigma}_n}{\hat{\sigma}_n + \hat{\sigma}_{n+1}} \tag{21}$$

which has an associated probability of error of

Pr(error between symbols n and n+1|x=$A_n$)

$$= Pr(\text{error between symbols } n \text{ and } n+1 | x = A_{n+1}) \tag{22}$$

$$= \frac{1}{2}\text{erfc}\left(\frac{Q_{n,n+1}}{\sqrt{2}}\right)$$

where $Q_{n,n+1}$ is the traditional Q-factor estimate $$Q_{n,n+1} = \frac{\hat{\mu}_{n+1} - \hat{\mu}_n}{\hat{\sigma}_n + \hat{\sigma}_{n+1}}. \tag{23}$$

The statistical analysis of routine 920 will usually be continually performed; thereby adjusting the decision levels in real time to compensate for time varying distortion/noise of the received signal. After routine 1320, the process for the current iteration returns to step 925 of FIG. 9.

Prior to moving onto the next subsection, the robustness of the Gaussian model is discussed. Like much of the conventional art, the conditional pdfs are modeled as Gaussian. However, because of the use of the $\epsilon$-supports to estimate the parameters of the Gaussian pdfs, the method still performs well in situations where the data is not Gaussian distributed. Specifically, recall that the first step of the analysis is to compute N $\epsilon$-support regions to characterize the region of significant probability for the conditional pdfs. Thus, if the s-supports are correctly associated with the conditional pdfs, then the thresholds will be established in the tails of the pdfs thus producing a low-probability of error. Fortunately, the method proposed in Eqs. (9)-(11), and the surrounding text, should easily and correctly determine the $\epsilon$-supports because the modes of the pdfs will be well separated in realistic communications systems. Thus, even though a Gaussian model is used to establish the thresholds in this sub-section, the use of the $\epsilon$-supports to determine the parameters still allow for non-Gaussian distributions (such as multi-modal distributions) to be handled as well.

Exemplary Embodiment of Sub-Method for Estimating Link Fidelity

Referring now to FIG. 14, this figure illustrates exemplary steps for routine 940 of FIG. 9 that estimates the fidelity of a multilevel signal according to an exemplary embodiment of the present invention. Routine 940 starts with step 1405 in which a conditional probability density function (pdf) is estimated for each symbol of the multilevel signal. Next, in step 1410, the probability of error for the entire system can be calculated. Specifically, the "wellness" of the data may be output as a voltage $v_{fid}$ that conveys signal fidelity to analog signal conditioning circuits to provide an improved eye opening for reduced error rate.

This sub-method allows for error performance to be gauged without explicit data error tests that can only be performed in artificial settings where the transmitted values are known. Specifically, using the above statistical characterization of the received data, the performance of the link can be estimated using random data. Efforts in the conventional art usually estimate the error rate of the link by transmitting a testing sequence of data (already known to the receiver) which is detected by the receiver. The receiver of the conventional art then counts how many decoding errors were encountered.

The proposed method, in contrast, leverages the probabilistic modeling of the system to estimate link error rates without the transmission of a predetermined testing sequence. In particular, the error rate can be estimated while receiving random data during real-world operation by exploiting Eq. (22). Specifically, the overall link symbol error rate can be obtained by averaging the probability of symbol error conditioned on a given transmitted symbol yielding:

$$Pr(\text{error}) = \frac{1}{N}\sum_{n=0}^{N-1} Pr(\text{error}|A_n) \quad (24)$$

$$= \frac{1}{N}\left[\begin{array}{c} Pr(\text{error}|A_0) + Pr(\text{error}|A_{N-1}) + \\ \sum_{n=1}^{N-2} Pr(\text{error}|A_n) \end{array}\right]$$

$$= \frac{1}{2N}\left\{\begin{array}{c} \text{erfc}\left(\frac{Q_{0,1}}{\sqrt{2}}\right) + \text{erfc}\left(\frac{Q_{N-2,N-1}}{\sqrt{2}}\right) + \\ \sum_{n=1}^{N-2}\left[\text{erfc}\left(\frac{Q_{n-1,n}}{\sqrt{2}}\right) + \text{erfc}\left(\frac{Q_{n,n+1}}{\sqrt{2}}\right)\right] \end{array}\right\}$$

$$= \frac{1}{N}\sum_{i=0}^{N-2} \text{erfc}\left(\frac{Q_{n,n+1}}{\sqrt{2}}\right)$$

Eq. (24) provides the symbol error probability. If desired, one can convert this to a bit error probability. Specifically, if a Gray-coding scheme is used for the binary representation of the data, then each symbol error between adjacent levels produces a single bit error. Considering that signals composed of N levels require to $\log_2 N$ bits for their binary representation, this yields a bit error probability of $$P(\text{bit error}) = \frac{P(\text{symbol error})}{\log_2 N} \quad (25)$$

$$= \frac{1}{N\log_2 N}\sum_{i=0}^{N-2} \text{erfc}\left(\frac{Q_{n,n+1}}{\sqrt{2}}\right).$$

This bit error probability can then be converted into an "effective" Q-factor (i.e. the Q value of an OOK system that has the same bit error rate as the multi-level system) via $$Q_{\text{eff}} = \sqrt{2}\,\text{erfc}inv(2Pr(\text{bit error})) \quad (26)$$

$$= \sqrt{2}\,\text{erfc}inv\left(\frac{2}{N\log_2 N}\sum_{n=0}^{N-2}\text{erfc}(Q_{n,n+1}/\sqrt{2})\right).$$

The reliability measures in Eqs. (24)-(26) are all equivalent, and thus, any of these three can serve as a fidelity measure of the channel reliability. However, the effective Q-factor of Eq. (26) is more practical for implementation because it is less susceptible to circuit noise. Specifically, the error rate of the link is expected to be near zero, and if either the bit or symbol error probability were used as the fidelity measure, then a small amount of noise in the circuitry would drown out the fidelity measure signal. The process then returns to step 945 of FIG. 9.

Figure 20:
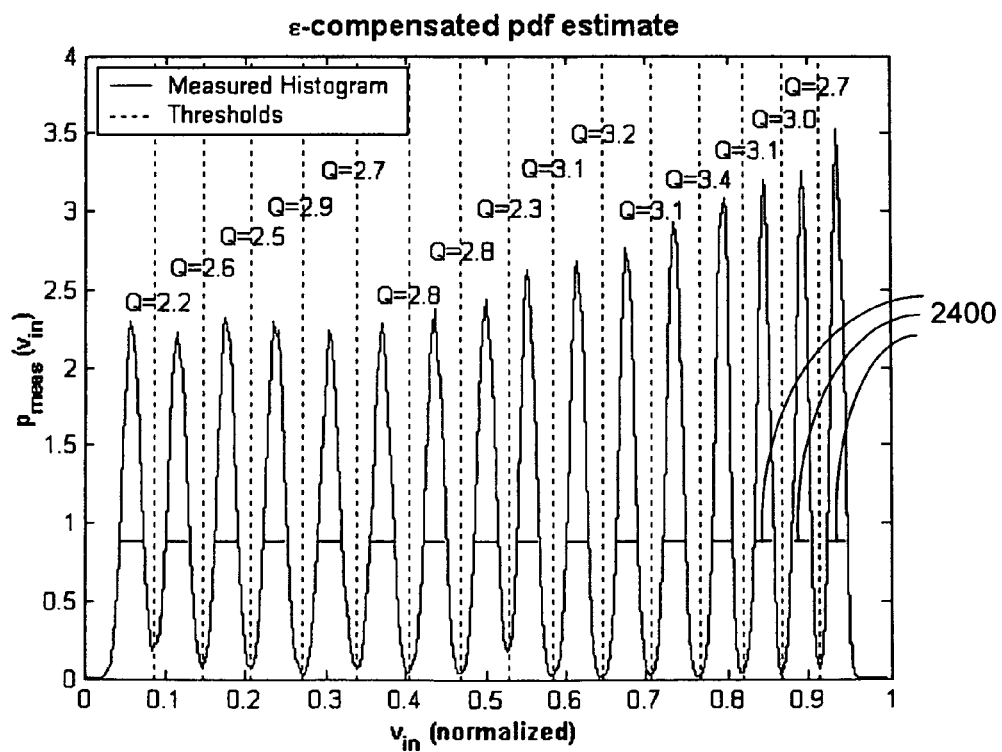
FIG. 20 illustrates a graph with a measured pdf along with decision thresholds and fidelity characterizations for an N=16 level multilevel signal according to an exemplary embodiment of the present invention.

Referring now to FIG. 20, this figure illustrates the measured pdf for N=16 level data received through 25 km of fiber. The line 2400 slicing through the pdf in FIG. 20 denotes the value of ϵ used to determine the ϵ-supports (i.e. the regions where the pdf exceeds ϵ). Thresholds (obtained from Eq. (21)) are shown as vertical dashed lines with the associated Q-factor (from Eq. (22)) for each pair of adjacent levels. The effective Q-factor (from Eq. (26)) for the multi-level system is 3.1.

The validity of Eqs (22)-(26) is strongly dependent on the Gaussian model. If the noise is not Gaussian, then the Q-factor does not give the probability of error as stated. However, in the non-Gaussian case, the method still supplies an intuitive quantification of the fidelity of the received signal which is related to the probability of decoding error. Thus, while the numerical value provided by the fidelity measure may not exactly relate to detection error probability, it still characterizes the fidelity of the link, i.e. large numerical values indicate better signal fidelity.

Exemplary Embodiment of Sub-Method for Gain Control

Referring back to step 950, because the ϵ-support regions calculated in routine 920 represent all the voltage ranges where a candidate symbol is likely to be received, the ϵ-supports can be used to determine an appropriate gain normalization factor for the received signal. In particular, the largest and smallest voltages among all of the ϵ-support regions represents the largest and smallest voltage likely to be received for a symbol transmission. These extreme values can thus be used to provide appropriate gain to scale the received signal such that the entire voltage swing of the system is utilized.

Specifically, the automatic gain voltage $V_{agc}$ can be taken as the reciprocal of the size of the convex hull of all of the ϵ-support regions, i.e.

$$V_{agc} = \frac{1}{\max_{A}\left\{\max_{a\in A}\{a\}\right\} - \min_{A}\left\{\min_{a\in A}\{a\}\right\}} \quad (27)$$

where A represents the various ϵ-supports associated with each level, and thus the denominator represents the peak-to-peak voltage of the received signal.

Alternative Exemplary Embodiment of Method for Decoding Multilevel Signals of FIG. 5A

Having given a detailed description of the embodiment illustrated by FIGS. 2 and 4, the embodiment given by the use of FIG. 5A in place of FIG. 4 is now discussed. The operation and implementation of this embodiment follows exactly as for FIG. 4 except that the second latch 430 is removed. Thus the statistical characterization upon which all the analysis is based covers the entire time span of the signal and not just the portion synchronized with the first plurality of comparators 405.

Alternative Exemplary Embodiment of Method for Decoding Multilevel Signals of FIG. 5B

The embodiment given by the use of FIG. 5B in place of FIG. 4 is now discussed. This embodiment differs from that illustrated in FIG. 4 in the following manner. First, step 910 is omitted as the alternative embodiment directly can calculate the pdf. This is done by sampling the signal with the ADC 440' which passes the samples onto the DSP. ADC 440' samples at the symbol rate with a high resolution. These samples are used both to decode the received symbol and produce the statistical characterization in the DSP. The DSP collects the data samples and can digitally generate the pdf estimate. The remaining steps 920-950 can also be absorbed into the DSP thereby obviating the need for the controller 445 in the SIU 220.

Alternative Exemplary Embodiment of Method for Decoding Multilevel Signals of FIG. 5C The embodiment given by the use of FIG. 5C in place of FIG. 4 is now discussed. The operation and implementation of this embodiment is identical to that for FIG. 4 except that the filtered ED output $v_{em}$ produces an estimate of the marginal pdf rather than the CDF. To see why this occurs, note that the only difference between FIGS. 4 and 5C are in the EDC. For FIG. 5C, the pair of second comparators 574, 576 produce as outputs the indicator functions $1(v_{rv}-\Delta<v_{in})$ and $1(v_{in}<v_{rv}+\Delta)$. Thus, the quantity going into the low-pass filter 435 is the binary function $1(v_{rv}-\Delta<v_{in}<v_{rv}+\Delta)$. Averaging this function over time produces the probability estimate $P(v_{rv}-\Delta<v_{in}<v_{rv}+\Delta)$ which is approximately proportional to the pdf $p(v_{in})$ for small values of $\Delta$. Thus, step 910 is omitted for this embodiment and the embodiment is the same as that for FIG. 4 in all other respects.

Alternative Exemplary Embodiment of Method for Decoding Multilevel Signals of FIGS. 7 and 11

Referring now to FIG. 11, this figure illustrates exemplary steps for routine 915 of FIG. 9 that calculates a pdf according to the alternate exemplary embodiment associated with FIG. 7. The steps of routine 915 correspond with the action taken by the ADC 235″ and track-and-hold 705 illustrated in FIG. 7. It is noted that step 910 of FIG. 9 for the exemplary embodiment of FIG. 7 may be omitted.

Routine 915 starts with step 1105 in which the holding circuit 705 in combination with the ADC 220″ measure the voltage of the received multilevel signal. Specifically, microcontroller 445 can sample the received analog voltage of the multilevel signal by triggering the holding circuit 705 at some time random in relation to the received data stream. The holding circuit 705 will necessarily have a capture bandwidth commensurate with the high-speed data stream, but will only need to be able to sample at rate much lower than that of the high-speed data stream.

Next in step 1110, the microcontroller 445 would then trigger the second ADC 440 conversion and record the resulting voltage. In step 1115, the microcontroller 445 can collect the digitized measurements of the voltages and obtain the histogram 810 of measured voltages as illustrated in FIG. 8B. Histogram 810 is an instance of a pdf estimate. The microcontroller 445 can continue this process until adequate statistic information can be gathered to determine the appropriate decision levels. The process then returns to routine 915 of FIG. 9.

CONCLUSION

The present invention uses a robust approach to setting the decision thresholds that assumes neither unimodality nor symmetry of the noise distributions but can also operate even if these assumptions hold. The invention exploits the estimated pdf and localized nature of the noise to detect regions of significant probability. Each of these regions should correspond to where a candidate symbol i should be declared in the decision process, i.e. each region determines the support of the conditional pdfs composing the observed marginal pdf. In cases where the number of regions exceeds the number of symbols (as may occur due to multi-modal noise distributions and estimation errors), the invention systematically merges regions based on prior knowledge that (i) redundant eyelids are spaced very close together (relative to the spacing between eye-lids associated with differing symbols) and (ii) the number of candidate symbols is a known system parameter.

Further, the voltage decision thresholds produced by the algorithm are used by the fifteen high-speed comparators, which are followed by combinational logic to properly decode the levels back to the encoded data streams. The fifteen comparators and combinational logic are closely related to a traditional flash ADC with the exception of optimal threshold control (as per present invention) and decoding methods more amenable to communication systems other than binary. The receiver 150 converts the 16-level input into properly decoded data streams.

As noted previously, it should be obvious to one skilled in the art that the simple circuits illustrated in FIGS. 4, 5, and 7 can be expanded to N-level transmissions by incorporating N−1 high-speed comparators, adapting the decoding logic, and a higher resolution low-speed ADC for statistic signal sampling.

One skilled in the art can appreciate that the methods described here can be applied to other modulation schemes other than N-PAM. Examples of such modulation schemes are phase shift keying, frequency shift keying, and combinations methods such as quadrature amplitude modulation. The extension of the proposed method simply involves the appropriate change of the control variable in the CDF/pdf estimation. Because no restrictive form the noise distribution is assumed, the present invention will adapt to the different data distribution associated with other modulation schemes, which the conventional art cannot.

While it is contemplated that the present invention is very suitable for optical networking environments, it can be appreciated that the present invention could be easily employed in fields involving lower-speed communications. For example, lower-speed communication fields can include, but are not limited to, wireless applications, and applications utilizing modems such as telephone, digital subscriber lines (DSL), and analog or digital cable.

It should be understood that the foregoing relates only to illustrate the embodiments of the present invention, and that numerous changes may be made therein without departing from the scope and spirit of the invention as defined by the following claims.

What is claimed is:

1. A desymbolizer for receiving and decoding a multilevel communication signal, comprising:
    an analog-to-digital converter for receiving and decoding the multilevel communication signal and comprising a plurality of comparators;
    a signal integrity unit coupled to the analog-to-digital converter, comprising a microcontroller for controlling a threshold voltage of each comparator located in the analog-to-digital converter, the microcontroller calculating at least one of a cumulative distribution function and a probability density function derived from the multilevel signal and associated with the threshold voltage of each comparator, and a digital-to-analog controller coupled to inputs of the comparators of the analog-to-digital converter.

2. The desymbolizer of claim 1, wherein the analog-to-digital converter is a first analog-digital converter, and the signal integrity unit further comprises a second analog-to-digital converter coupled to the first analog-to-digital controller.

3. The desymbolizer of claim 1, wherein the analog-to-digital converter comprises:
    a plurality of comparators for receiving the multilevel signal; and
    a decoder coupled to the outputs of the comparators.

4. The desymbolizer of claim 1, wherein the output of the analog-to-digital converter is coupled to a low-pass filter and the output of the low-pass filter is coupled to the microcontroller.

5. The desymbolizer of claim 1, wherein the analog-to-digital converter comprises a holding circuit.

6. The desymbolizer of claim 5, wherein the holding circuit comprises one of a track-and-hold circuit and a sample-and-hold circuit.

7. A desymbolizer for receiving and decoding a multilevel communication signal, comprising:
  an analog-to-digital converter for receiving and decoding the multilevel communication signal;
  a signal integrity unit coupled to the analog-to-digital converter for calculating and controlling one or more threshold voltages supplied to the analog-to-digital converter, for calculating at least one of a cumulative distribution function and a probability density function derived from the multilevel signal and associated with the one or more threshold voltages; and
  a signal conditioning filter that equalizes and optimally filters the multilevel communication signal prior to the analog-to-digital converter, where the signal integrity unit selects an operating point of the signal conditioning filter based upon the determination of the fidelity of the multilevel signal.

8. The desymbolizer of claim 7, wherein the signal conditioning filter comprises programmable analog signal processing modules.

9. The desymbolizer of claim 7, wherein the signal conditioning filter comprises an equalizer.

10. The desymbolizer of claim 7, where the signal conditioning filter comprises at least one clock recovery circuit.

11. The desymbolizer of claim 7, wherein the analog-to-digital converter comprises:
  a plurality of comparators for receiving the multilevel signal; and
  a decoder coupled to the outputs of the comparators.

12. The desymbolizer of claim 7, wherein the output of the analog-to-digital converter is coupled to a low-pass filter and the output of the low-pass filter is coupled to the signal integrity unit.

13. The desymbolizer of claim 7, wherein the analog-to-digital converter comprises a holding circuit.

14. The desymbolizer of claim 13, wherein the holding circuit comprises one of a track-and-hold circuit and a sample-and-hold circuit.

15. The desymbolizer of claim 13, wherein the holding circuit samples the multilevel signal at random intervals.

16. The desymbolizer of claim 13, wherein the holding circuit samples the multilevel signal at a periodic sampling rate wherein the period is an integer multiple of the symbol period.

17. A method for determining threshold voltages of comparators in a multilevel signal receiver system, comprising the steps of:
  evaluating voltage levels of a multilevel signal at predetermined time intervals;
  estimating a probability density function based on the voltage levels;
  determining one or more statistical centers positioned on local minima that are present in the probability density function; and
  adjusting one or more threshold voltage levels based on the one or more statistical centers.

18. The method of claim 17, further comprising the step of estimating a cumulative distribution function based on a received multilevel signal.

19. The method of claim 17, wherein evaluating voltage levels of a multilevel signal at predetermined time intervals comprises evaluating voltage levels at random time intervals.

* * * * *